United States Patent [19]

Bergh et al.

[11] Patent Number: 5,620,271
[45] Date of Patent: Apr. 15, 1997

[54] THREE RING BINDER PAGE FOR HOLDING COMPACT DISCS

[75] Inventors: James A. Bergh, Boulder; Terrence M. Drew, Superior, both of Colo.

[73] Assignee: Case Logic, Inc., Longmont, Colo.

[21] Appl. No.: 527,661

[22] Filed: Sep. 13, 1995

[51] Int. Cl.$^6$ .............................. B42F 13/00; B65D 85/30; B65D 85/57

[52] U.S. Cl. .................. 402/79; 402/80 R; 402/80 P; 281/31; 281/38; 206/308.1; 206/307

[58] Field of Search ....................... 402/79, 80 R, 402/4, 80 P; 281/15.1, 31, 38, 35, 51; 206/308.1, 309, 307, 313, 308.3, 311, 232

[56] References Cited

U.S. PATENT DOCUMENTS

| | | | |
|---|---|---|---|
| D. 261,155 | 10/1981 | Nast . | |
| 1,088,748 | 3/1914 | Uffner | 281/22 |
| 1,121,446 | 12/1914 | Alter | 206/311 |
| 3,722,564 | 3/1973 | Croon | 150/39 |
| 3,759,305 | 9/1973 | McIntyre | 150/39 |
| 4,263,357 | 4/1981 | Holson . | |
| 4,447,973 | 5/1984 | Wihlke . | |
| 4,508,366 | 4/1985 | Brindle . | |
| 4,620,630 | 11/1986 | Moss . | |
| 4,793,477 | 12/1988 | Manning et al. | 206/232 |
| 4,850,731 | 7/1989 | Youngs . | |
| 4,860,897 | 8/1989 | Fowler et al. | 206/444 |
| 5,101,973 | 4/1992 | Martinez . | |
| 5,199,743 | 4/1993 | Rosinski, III | 281/45 |
| 5,224,599 | 7/1993 | Uchida | 206/444 |
| 5,290,118 | 3/1994 | Ozeki | 402/79 |
| 5,316,404 | 5/1994 | Hensel | 402/79 |
| 5,396,987 | 3/1995 | Temple et al. . | |
| 5,407,067 | 4/1995 | Cotter et al. | 206/312 |
| 5,462,160 | 10/1995 | Youngs | 206/312 |
| 5,501,540 | 3/1996 | Ho | 402/79 X |
| 5,524,998 | 6/1996 | Schwartz | 402/79 |

Primary Examiner—Frances Han
Attorney, Agent, or Firm—F. A. Sirr; E. C. Hancock; Holland & Hart llp

[57] ABSTRACT

A loose leaf page for selectively storing four compact discs (CDs) on each side of the page, or for storing two CDs and associated printed and graphic information on each side of the page. A flexible, plastic, two-sided, loose leaf page includes four CD storage pockets per side of the page, and includes a hole pattern that facilitates releasably mounting the page in a standard cover-size 1-inch, 1 ½-inch or 3 inch three-ring binder notebook, certain embodiments also facilitating mounting of the page in a three-ring Chicago-posted binder. In order to prevent interference between two CDs that reside closest to the binder rings when a user manually leaves through binder pages, the page includes a six-hole pattern, or a three-hole/three-notch pattern, that is configured to ensure that a vertical pivot line, or binder edge, on the page being turned moves past the vertical leading edge of the three rings, and then moves backward under the three rings. The CD storage page includes two outer transparent polypropylene layers and an inner layer that is constructed of soft nonwoven polypropylene.

42 Claims, 12 Drawing Sheets

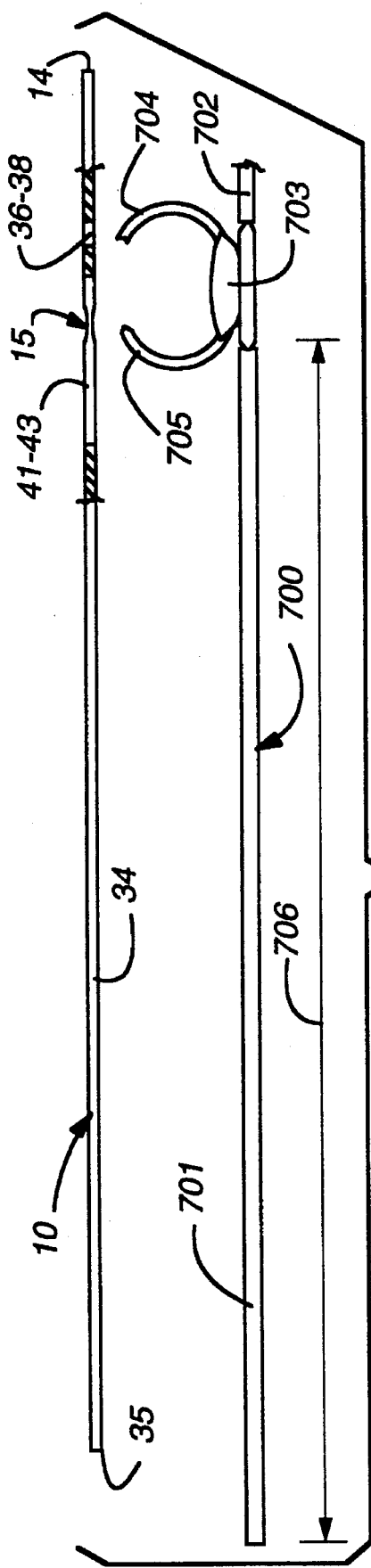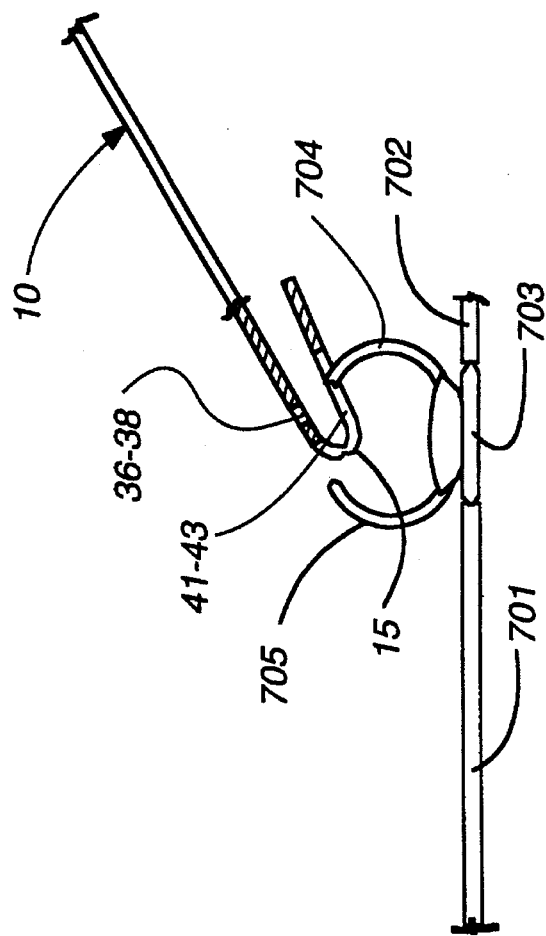
Fig. 7
Fig. 7A

THREE RING BINDER PAGE FOR HOLDING COMPACT DISCS

BACKGROUND OF THE INVENTION

1. Field of the Invention

This invention relates to means for efficiently storing compact discs in a conventional and well known three-ring binder having standard size covers. More particularly, this invention relates to means for storing a number of compact discs in individual one-disc pockets that are provided on the two opposite sides of a thin, flat, and flexible multi-ply page, so as to facilitate both physical and visual access to eight compact discs, or to four compact discs and printed and graphic information that relates to the four discs.

2. Description of the Related Art

Traditionally, compact discs (CDs) are sold and stored in well-known rigid and relatively thick plastic jewel boxes. Typical jewel boxes include removable printed inserts having one, or more, narrow title bars along at least one narrow edge to thereby permit the owner to find a particular compact disc when a number of the jewel boxes are stacked, or stored, next to each other.

Additionally, jewel boxes typically contain a multi-page insert that lists the songs on the CD and shows a related graphic illustration.

Cds are thin, circular, about 4 ¾-inch in diameter, and are relatively rugged. The amount of protection that is provided by a jewel box is more than necessary in most circumstances. However, jewel boxes are unnecessarily bulky; thus, limiting the number of CDs that can be carried or stored in any given carrier or cabinet.

As is well known, the construction and arrangement of a CD provides a relative thick and transparent plastic disc. A first side of this plastic disc is exposed to a laser beam for the purpose of reading the CD. The other side of this plastic disc is embossed in order to record a data pattern in a spiral or concentric pattern. This other side of the plastic disc carries a thin disc shaped metal foil, usually aluminum. In this manner, the laser beam is enabled to read the data, for example music, that is contained on the metal foil side of the plastic disc. The exposed side of the metal foil usually carries text/graphics that is associated with the disc's recorded data. In order to adequately protect such a CD, it is necessary to protect both sides of the disc from scratches and the like. Scratches to the disc's plastic side may provide interference with reflection of the laser beam from the CD's data patterns, whereas scratches to the disc's text/graphics side may remove reflective portions of the metal foil and thereby render portions of the CD's recorded data difficult to read.

Accordingly, relatively thin sleeves for storing individual CDs have evolved to protect the disc surface from dust, scratching and the like.

The art provides a variety of conventional means for mounting and holding articles in a three-ring binder, as is exemplified by the following patents; Des. 261,155, utility U.S. Pat. Nos. 4,263,357, 4,447,973, 4,508,366 and 4,850,731. In addition, multilayer packaging of disk type articles is known as exemplified by U.S. Pat. Nos. 4,620,630 and 5,101,973.

U.S. Pat. No. 5,396,987 describes a container for a compact disc wherein three thin layers of polypropylene are heat sealed together using line type heat seals, the intermediate one of the three layer being relatively soft.

It is also known in the art to provide a three-ring binder page for the storage of CDs in binders of a nonstandard size. That is, known CD storage pages of this prior type have a planar size that are too large to mount within the covers of a standard size three-ring binder that has multiple and general purpose binding utility. In addition, such known binder pages are constructed and arranged to store, or hold, four CDs on only one side of the page, and the CD storage pockets are provided with a wide and upward facing insertion/removal slot that does not adequately protect the surface of the CD.

FIG. 16 is an end view of a well-known standard size three-ring binder 70 having two covers 71, 72 that are hinged on a binder edge 73 that carries three openable metal rings 74. In this figure, the horizontal width dimension 75 that extends from the innermost edge of rings 74 to the outermost edge of covers 71, 72 is nominally 9.0-inches, but can vary in the general range of from about 8.5 to 9.5-inches, depending upon the manufacturer of binder 70. Known three-ring binder pages for storing four CDs are too large to fit within dimension 75.

A need remains in the art for a three-ring binder punched page that holds a number of CDs, and perhaps their multi-page illustrative literature, wherein the page's hole pattern facilitates use with a number of different standard three-ring binders of different thicknesses and binder types, wherein the page's binder-edge hole/slot pattern ensures that the pages will not bind as they are turned within the binder, and wherein the page construction requires minimal storage volume while protecting both surface's of the CDs from scratches and the like, all in a manner that permits the user to quickly identify and locate a desired CD and/or its related literature.

SUMMARY OF THE INVENTION

This invention provides a flexible, plastic, two-sided, loose leaf page for storing a number of compact discs within a number of one-disc pockets that are contained on the two sides of the page. In this manner, both physical and visual access is provided to eight discs, or physical and visual access is provided to four discs, and printed and graphic information that relates to these four discs.

A preferred embodiment of the invention releasably holds, or stores, four CDs on each side of the flat page or sheet, or if desired, two CDs on each side of the page along with the two liner notes or booklets that relate to each of the two CDs per page side.

A CD storage page in accordance with the invention contains a hole pattern that facilitates releasably mounting the CD storage page in a ½-inch, 1-inch, 1 ½-inch, 2-inch, or 3-inch thick three-ring binder, or notebook, that has a standard cover size generally associated with a general utility of holding text/graphics pages that have an 8.5 to 9.0 wide (called horizontal herein) by 11 high (called vertical herein) inch size format.

In one embodiment of the invention, the CD storage page includes a binder edge that is foldable. In another embodiment of the invention, the foldable binder edge is eliminated.

The first named embodiment of the invention finds utility when mounting the CD storage pages in narrow three-ring binders; for example, in the ½ and 1-inch three-ring binders. In addition, the mounting hole pattern that is provided in this first embodiment of the invention facilitates mounting the CD storage pages in a Chicago-posted binder.

Standard and well-known three-ring binders 70, shown in FIG. 16, have two external covers 71, 72 that measure about 11 ½ -inches high and about 10-inches wide, the height dimension being measured parallel to the binder's linear ring-containing edge 73, and the width dimension being measured perpendicular to the edge 73 that carries the three binder rings 74. As shown in FIG. 16, the horizontal dimension 75 that is available for page storage is nominally 9.0-inches.

Standard size CDs are about ¹⁄₁₆-inch thick and have a diameter of about 4 ¾-inch. Thus, in order to provide four one-CD pockets per page side, the construction and arrangement of the present invention positions the CD pockets so as to take advantage of the vertical space that exists between the binder's three rings 74 of FIG. 16; i.e., a circumferential edge of a DC resides slightly within a vertical cylinder that is defined by the three closed and vertically aligned binder rings 74.

In addition, and in order to prevent physical interference or obstruction between the two inner CDs that reside closest to the vertically oriented binder rings 74 of FIG. 16 when binder 70 contains multiple pages, and when a user opens binder 70 and then manually leaves through the pages, in one embodiment of the invention, the page contains a six-hole pattern, and in another embodiment of the invention, the page contains a three-hole/three-slot pattern, that ensures that a vertical pivot line on the page being turned will move past the vertical leading edge of the three-binder rings 74, and then backward under the three binder rings 74.

In addition, the construction and arrangement of the page's hole/slot pattern allows the entire page to hinge over the binder's three rings 74 in a manner to accommodate the narrowing circle that is defined by the two mating portions of binder rings 74, as the three-ring binder 74 become generally full of binder pages in accordance with this invention.

When CD storage pages in accordance with the invention are used in a relatively thin ½-inch or 1-inch three-ring binder, the pages of embodiments of the invention containing a foldable hinge flap are nested in pairs, with one page's hinge flap fitting inside the other page's hinge flap. When CD storage pages in accordance with this embodiment of the invention are used in the thicker three-ring binders, all pages install individually, as will be apparent. When CD storage pages in accordance with this embodiment of the invention are used in Chicago-posted binders, the pages lay flat, that is the page's hinge flap is not folded, as will be apparent.

In another embodiment of the invention, the CD storage page is configured without a fold line or a hinge flap, and these pages install in the same manner in all size standard three-ring binders.

In accordance with a preferred embodiment of the invention, each CD storage page was provided with four one-CD storage pockets per page side; i.e., eight pockets per page. The CD storage pockets were arranged in a square matrix comprising two vertical columns and two horizontal rows. Each of the four stored pockets was about 4.843-inches in vertical height and horizontal width. The four CD storage pockets were each provided with a linear and vertically extending CD insertion/removal edge opening of this same vertical height, with the insertion/removal openings facing in a direction away from the binder's three rings 74; i.e., facing toward the vertical open edge of three-ring binder 70.

Each of the four CD storage pockets per page side included a centrally located and circular central finger hole or opening about 1-inch in diameter. A horizontal slot, or slit, about 0.025-inches in vertical height was generally centered in the area of the CD storage pocket, and extended from the pocket's insertion/removal opening to the pocket's finger hole. This horizontal slit diverged, or widened ,as it approached the circular finger hole, and met the circular hole as the slit vertically opened to a tear-drop shape that was formed by upper and lower horizontally extending surfaces that were each formed about a ½-inch radius.

In an alternate embodiment, the above-described centrally located finger holes were not used. Rather, each of the four CD storage products per page side included a horizontal slot, or slit, about 0.50-inches in vertical heights. This slot was generally centered in the area of the CD storage product and extended from the pocket's insertion/removal opening to the general center of the storage product.

In accordance with the invention, many types of CD removal slots may be used as long as the widest portion of the selected slot configuration does not exceed about 0.50-inch in vertical height.

Since it is contemplated that a standard three-ring binder 70, as shown in FIG. 16, will hold a number of CD storage pages in accordance with the invention, the facing surfaces of these pages will physically engage and rub together as binder 70 is moved, and the like. The above-described configuration of storage pocket finger holes and horizontal slots, or a horizontal slot about 0.50-inch high, provides substantially complete coverage of the facing CD surfaces, thus protecting these facing surfaces from undesirable scratches and the like.

A user removes a CD from its pocket by first inserting a finger into the central opening that is provided in a CD. The user then pulls the CD to the left and out of the pocket's insertion/removal opening, as the user's finger moves along and through the above-described 0.25 or 0.50-inch high horizontal slit.

A CD storage page in accordance with an embodiment of the invention, included two outer transparent polypropylene layers and an inner opaque layer that comprised an intermediate adhesive layer, and two outer polypropylene layers that were formed of a soft nonwoven construction.

These and other objects, features and advantages will be apparent to those of skill in the art upon reference to the following detailed description of the invention, which description makes reference to the drawing.

BRIEF DESCRIPTION OF THE DRAWING

FIG. 7 is a side view of an open and standard three-ring binder of the either the 1-inch, 1 ½-inch or 3-inch three size, wherein the CD storage page of FIG. 1 is shown in an elevated position vertically over the three open binder rings, prior to folding the binder page on its fold line, whereupon the folded binder page may be lower onto the open binder rings, as is seen in FIG. 7A.

DESCRIPTION OF THE PREFERRED EMBODIMENTS

Figure 1A:
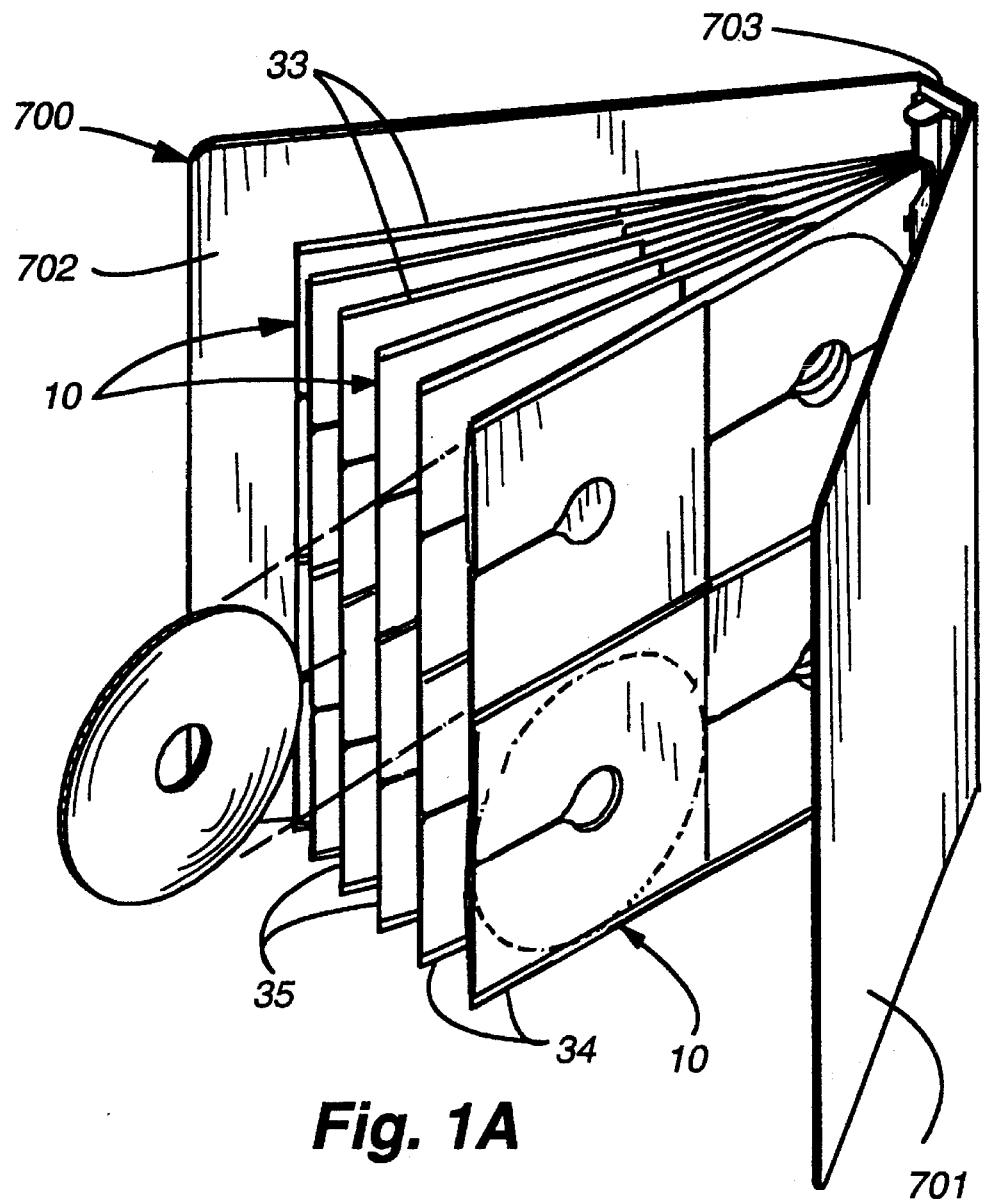
FIG. 1, consisting of FIG. 1A and FIG. 1B, is a plan view of a loose leaf, two-sided, CD storage page in accordance with the invention, this page being usable to store a number of compact discs (CDs) within a thin, flexible, multi-ply page, so as to provide physical and visual access to eight CDs, wherein four CDs are held on each side of the page, or to provide physical and visual access-to four CDs and the printed/graphic information that relates to the four CDs, in which case, two CDs and their printed/graphic information are held on each side of the page, the opposite side plan view of the page being a mirror image of FIG. 1A.

FIG. 1A is a plan view of a rectangular shaped, loose leaf, two-sided, CD storage page 10 in accordance with the invention. As will be apparent, page 10 is foldable, and is usable to store a maximum of eight CDs within the four CD storage pockets that are provided on each side of page 10. Another utility of page 10 is to store two CDs on each side of the page, in which case, the printed/graphic information relating to a CD can also be stored on the same side of page 10 as its related CD. While FIG. 1A shows only one side of a CD storage page 10 in accordance with the invention, the other side of page 10 is a mirror image thereof.

Figure 1B:
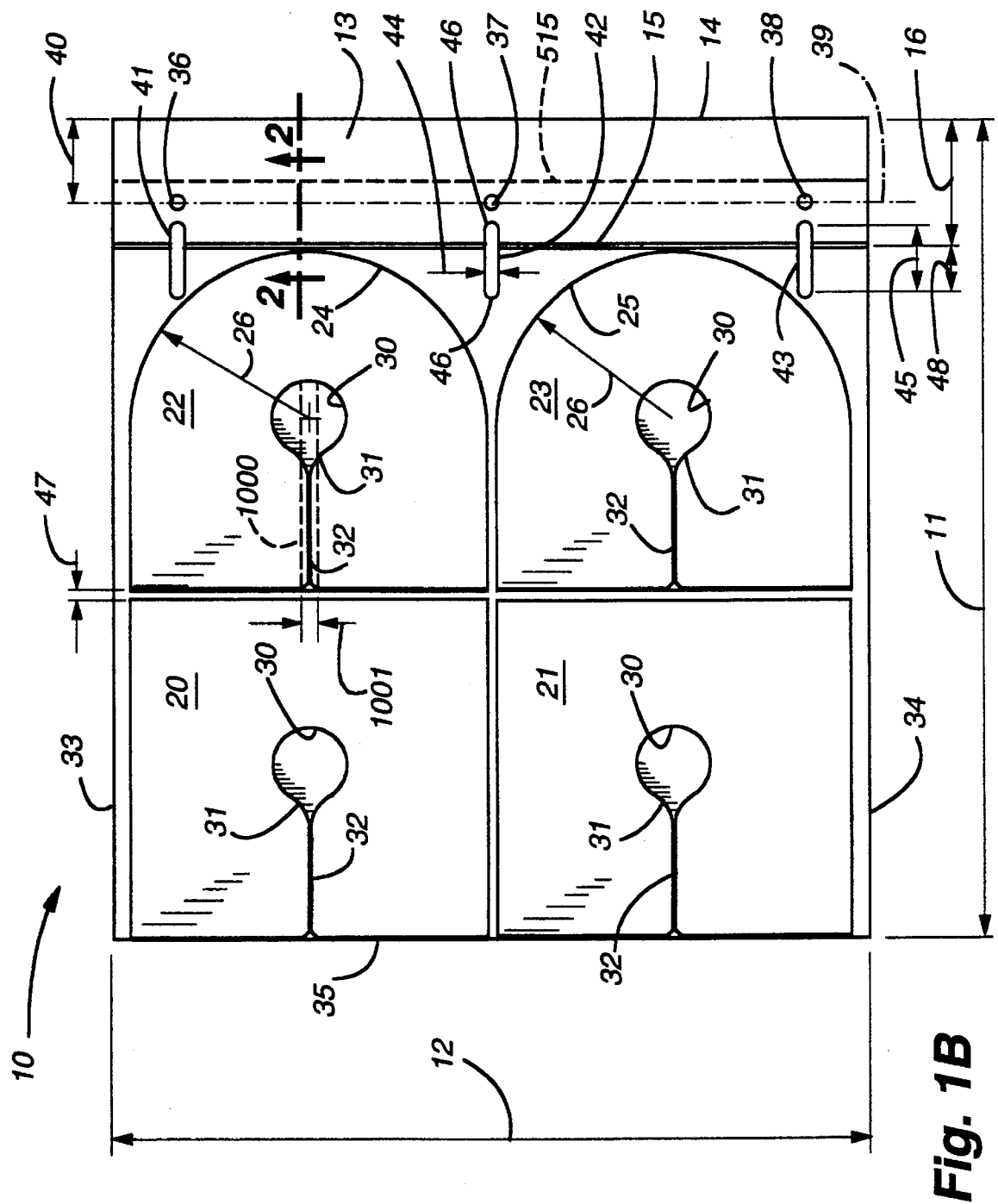

In an embodiment of the invention shown in FIGS. 1A and 1B, the flat or unfolded horizontal width 11 of rectangular page 10 was about 11.336-inches, and the vertical height 12 of page 10 was about 10.25-inches. Page 10 includes a foldable mounting, or hinge flap 13, that is defined by vertically extending right hand page edge 14 and a vertically extending and deep heat seal fold line 15 that extends generally parallel to page edge 14. In an embodiment of the invention, the horizontal width 16 of flap 13 was about 1.75-inch.

Heat seal line 15 is characterized as a deep heat seal line in that the formation of heat seal line 15 compresses the multiple sheets that make up page 10 so that the page thickness along fold line 15 is about 0.0011-inch, thus providing less page thickness along fold line 15 then exists along the page's other heat seal lines that will be described.

Page 10 includes a horizontally extending upper edge 33, and a horizontally extending lower page edge 34 that is parallel to edge 33. As will be apparent, page edges 33, 34 are defined by two horizontally extending and parallel heat seal lines. In an embodiment of the invention, the page's vertically extending left hand edge 35, that extends generally parallel to both fold line 15 and right hand page edge 14, was not heat sealed.

Each flat and generally planar side of page 10 includes four one-CD storage pockets 20, 21, 22 and 23 that are arranged in a square matrix comprising two horizontal pocket rows 20, 22 and 21, 23, and two vertical pocket columns 20, 21 and 22, 23. The following dimensions are a nonlimiting example of an embodiment of the invention. The two outer CD storage pockets 20, 21 are of a square shape, about 4 ¾-inch on each side. The two inner or binder side CD storage pockets 22, 23 also occupy a generally 4 ¾-inch by 4 ¾-inch area. However, the binder side of each of the two inner pockets 22, 23 comprises a semicircular portion 24, 25 that is formed with a radius 26 of about 2 ⅜-inch. As will be apparent, the bounds of CD storage pockets 20–23 are defined by heat seal lines that are used to seal the multiple plies of page 10 together.

Numeral 47 identifies a common horizontal spacing that is provided between the two upper CD storage pockets 22 and 20, and between the two lower CD storage pockets 21, 23, distance 47 being about 0.063-inch in an embodiment of the invention.

Each of the four CD pockets 20–23 that exist on each side of page 10 includes a centrally disposed and circular finger opening 30 that is about 1-inch in diameter. The left hand side of each opening 30 is formed to have a tear-drop shape extension 31 having two sides that are formed about a 0.5-inch radius. The left hand side of each of the four tear-drop extensions 31 terminates at a thin horizontally extending slot 32 that is about 0.025-inches in vertical height. Preferably, slots 32 extend parallel to horizontal page edges 33, 34.

The intended utility of a CD storage page 10 in accordance with the invention is that the CD's clear plastic beam-receiving surface be placed so as to face inward, and that the CD's text/graphics surface face outward. As is apparent, the use of the above-described small-size finger opening and horizontal slot construction and arrangement in accordance with the invention minimizes the likelihood that either side of a CD contained within a storage pocket can be physically damages as by scratching, or the like, especially when multiple CD storage pages 10 in accordance with the invention are loaded into a standard size three-ring binder.

While use of this small-size finger opening 30 and horizontal slot 32 is of adequate utility, it is to be understood that within the spirit and scope of this invention, opening 30 and slot 32 can be replaced by any similar shape, and in an embodiment of the invention, the FIG. 1B shape 30, 32 was replaced by a slot 1000 having a uniform vertical height 1001 that did not exceed about 0.50-inch.

The right hand binder portion of CD storage page 10 includes three circular through-holes 36, 37, 38 that are each about 0.1875-inch in diameter. Circular holes 36–38 lie on a common vertical axis 39 that extends generally parallel to page edge 14, and is offset a distance 40 from page edge 14. In an embodiment of the invention, distance 40 was about 1.125-inches. The three circular binder holes 36–38 are generally centered on the vertical height of page 10, and in an embodiment of the invention, holes 36 and 38 were offset a distance of about 0.84375-inch inward from the page's upper and lower edges 33, 34, respectively. In this embodiment of the invention, central hole 37 was spaced a distance of about 4.250 to about 4.281-inch from each of the two holes 36 and 38.

The right hand portion of page 10 also includes three horizontally extending and elongated through-holes 41, 42, 43. The three elongated holes or slots 41–43 are each about 0.1875-inch in vertical height 44, and are each about 0.875-inch in horizontal length 45, wherein the horizontal length of elongated holes 41–43 is measured from center to center of the two terminal radius. The two horizontal ends 46 of each elongated hole 41–43 preferably terminate two radius surfaces; for example, surfaces having a radius of about 0.09375-inch. As can be seen from FIG. 1A, each of the three elongated holes 41–43 is in horizontal alignment with an individual one of the three circular holes 36–38. Elongated holes 41–43 are also vertically aligned so that each of the holes 41–43 is equally horizontally spaced from circular holes 36–38, and from the page's right hand edge 14.

A feature of the invention provides that elongated holes 41–43 are positioned so that the center of the radius that is located at the left hand end 46 of each hole is located a distance 48 that is about 0.625-inch to the left of fold line 15.

As will be apparent, when CD storage page 10 is folded along fold line 15, each of the three circular holes 36–37 is brought into general alignment with the left hand end of an elongated hole or slot 41–43. In this aligned position, each hole/slot combination is in a position to be lowered onto the left hand one of a pair of mating ring portions that comprise an open binder ring. For example, FIG. 7A shows a page 10 in the above-described aligned position wherein each hole/slot combination is in a position to be lowered onto right hand one 704 of a pair of mating ring portions 704, 705 that comprise an open binder ring.

Figure 2:
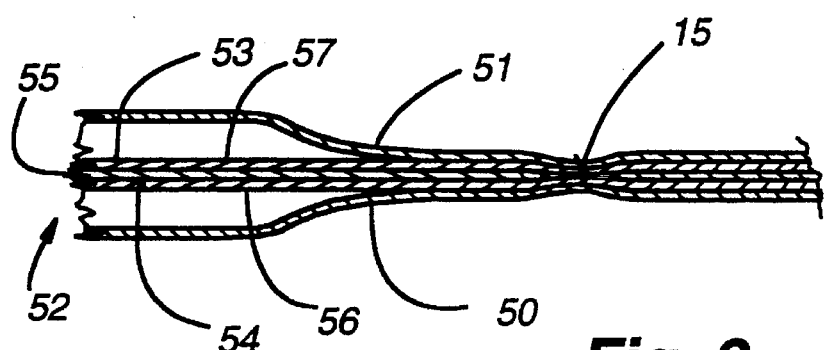
FIG. 2 is an exploded and enlarged side view of a portion of a multi-ply CD storage page in accordance with the invention, this figure being useful in explaining the page's multiple ply construction and arrangement.

FIG. 2 is an exploded and enlarged edge, or side view, of a portion of a multi-ply CD storage page in accordance with the invention, this figure being useful in explaining the multiple ply construction and arrangement of storage pages 10 in accordance with the invention.

As is apparent from FIGS. 1A and 1B, the two outer plies 50, 51 of CD storage page 10 are substantially identical in form and construction, and each of these two outer plies 50, 51 contains four circular finger holes 30 through which the two opposite planar surfaces 56 and 57 of a middle ply 52 can be viewed.

More specifically, and with reference to FIG. 2, each of the outer plies 50, 51 is preferably formed of a thin extruded film or sheet of transparent polypropylene that is about 0.00055-inch thick, preferably having a matte finish. Inner ply 52 is formed, extruded, or laminated to form a thin, three-member, unitary ply 52 having an extrudate adhesive layer or member 55, and having two outer layers or members 53, 54 that each comprise an opaque, nonwoven, and relatively soft polypropylene layer; for example, the Stearns brand nonwoven polypropylene having a weight of about 30 grams per square yard. As will be appreciated by those of skill in the art, the formation of inner ply 52 provides a unitary assembly having the three layers 53, 55, 54. In an embodiment of the invention, adhesive layer 55 was about 0.000125-inch thick, whereas outer layers 53, 54 were each about 0.00055 inch thick. Layers 53, 54 that are formed of nonwoven polypropylene have the visual appearance of a soft quilted surface.

The intent and purpose of CD storage page 10 is that the CDs that are stored therein reside in pockets 20–23 with their text/graphics side visible through transparent layers 50, 51, and with their opposite and clear plastic sides in physical contact with soft surfaces 56, 57 of inner ply 52.

Surfaces 56, 57 are soft and protective of the clear plastic disc surfaces through which a laser beam reads the CD, whereas layers 50, 51 have finger openings and slots that are of minimum area so as to maximize the protection that is afford to the text/graphics sides of the CDs, this side of the CD carrying a thin and reflective aluminum layer whose outer surface carries the CD's text/graphics material, and whose inner surface provides for reflection of a reading laser beam.

Figure 3:
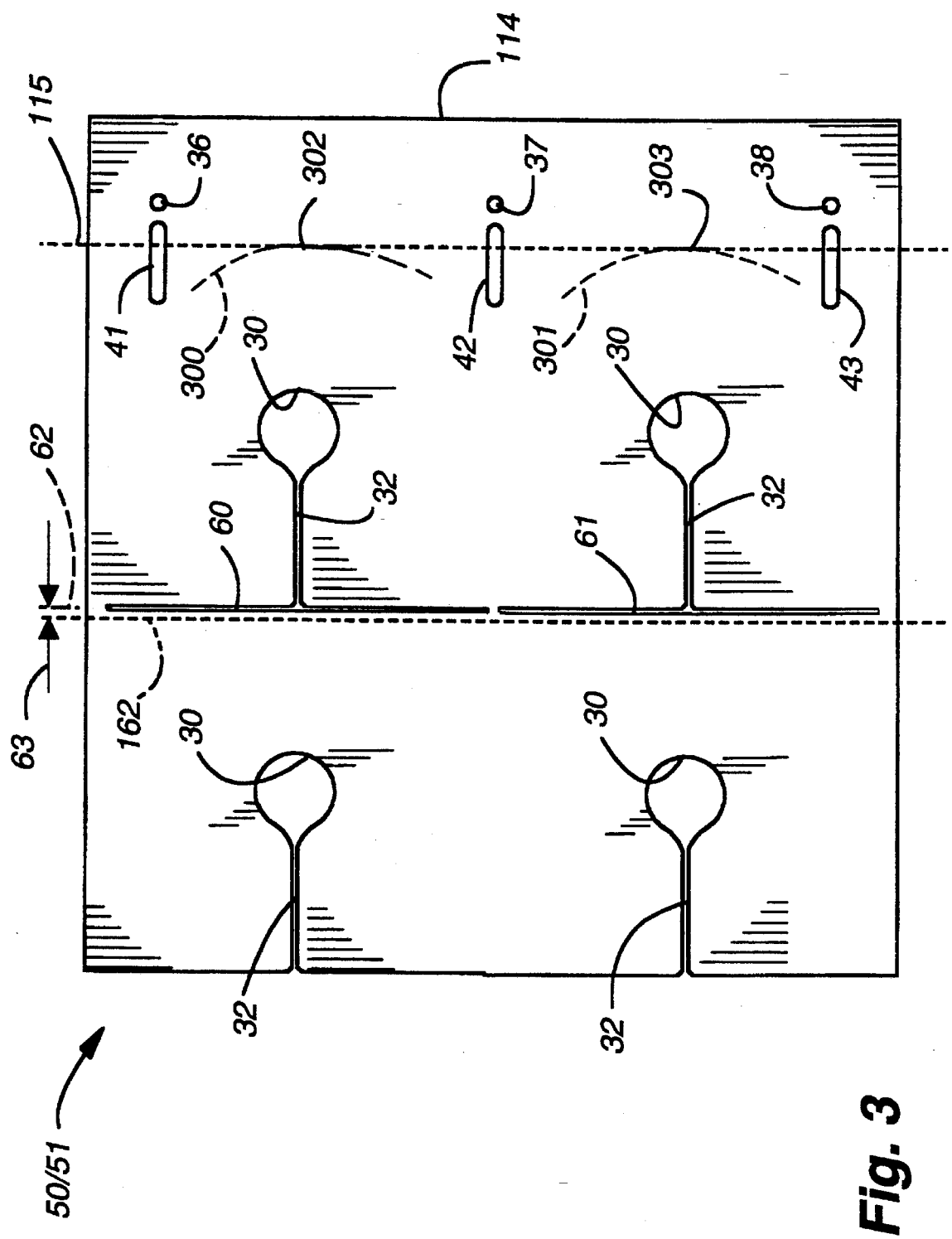
FIG. 3 is a plan view similar to FIG. 1A showing one embodiment of the two transparent outer sheets that are included in the binder page of FIG. 1, and showing the cut line pattern that is formed in each of the two outer sheets of the binder page.

FIG. 3 is a plan view similar to FIG. 1 showing one embodiment of the two rectangular and transparent outer sheets 50, 51 that comprise portions of the CD storage page of FIG. 1. In FIG. 3, the two outer sheets 50, 51 are each formed from a single sheet, whereas in FIG. 4, another embodiment will be described wherein the two transparent outer sheets 50, 51 are each formed from as a two member assembly.

FIG. 3 shows the cut line pattern that is formed in each of the two outer sheets 50, 51, and shows by means of a dotted line 115 the position of FIG. 1's heat seal deep fold line 15. Through holes 36–38 and 41–43 are punched, or cut, into each of the outer sheets 50, 51, as are tear drop shaped finger openings 30 and slots 32. In an embodiment of the invention, the above-mentioned through holes were punched in a fully assembled CD storage page; i.e., after the three page members 50, 51, 52 were heat sealed together.

In addition, linear or straight cuts 60, 61 are formed in each of the outer sheets 50, 51 to form the insertion/removal openings for CD storage pockets 22, 23, respectively. Cuts 60, 61 are aligned on an axis 62. In addition, cuts 60, 61 are centered on slots 32, extend substantially parallel to dotted line 115 and to the right hand edge 114 of the sheet, and cuts 60, 61 are each about 4.843 inches long.

Dotted lines 300, 301 show the position that the right hand peripheral edge of two CDs that are stored in storage pockets 22, 23, respectively. These two CDs occupy a position relative to fold line 15 as represented by numeral 115. As a feature of the invention, inner and outer sheets 50, 51 may be provided with short linear cuts 302, 303 that are located generally coincident with dotted line 115 and parallel to edge 114. Cuts 302, 303 operate to accommodate movement of the right hand edge of the CDs that are stored in pockets 22, 23, respectively. As will be apparent relative to the embodiment of the invention shown in FIG. 13, cuts 302, 303, and the function that is provided thereby, can also be provided by the use of like-positioned through holes.

In another embodiment of the invention, sheets 50, 51, 52 are formed from three moving webs 50, 51, 52 wherein the CD insertion/removal openings 30 and slits 32 are first made in the two moving sheet webs 50, 51 prior to heat sealing the three moving webs into an moving web assembly, whereupon the page's through holes 36–38 and 41–43 are punched in the now-sealed-together assembly of three moving webs 50, 51, 52.

Figure 4:
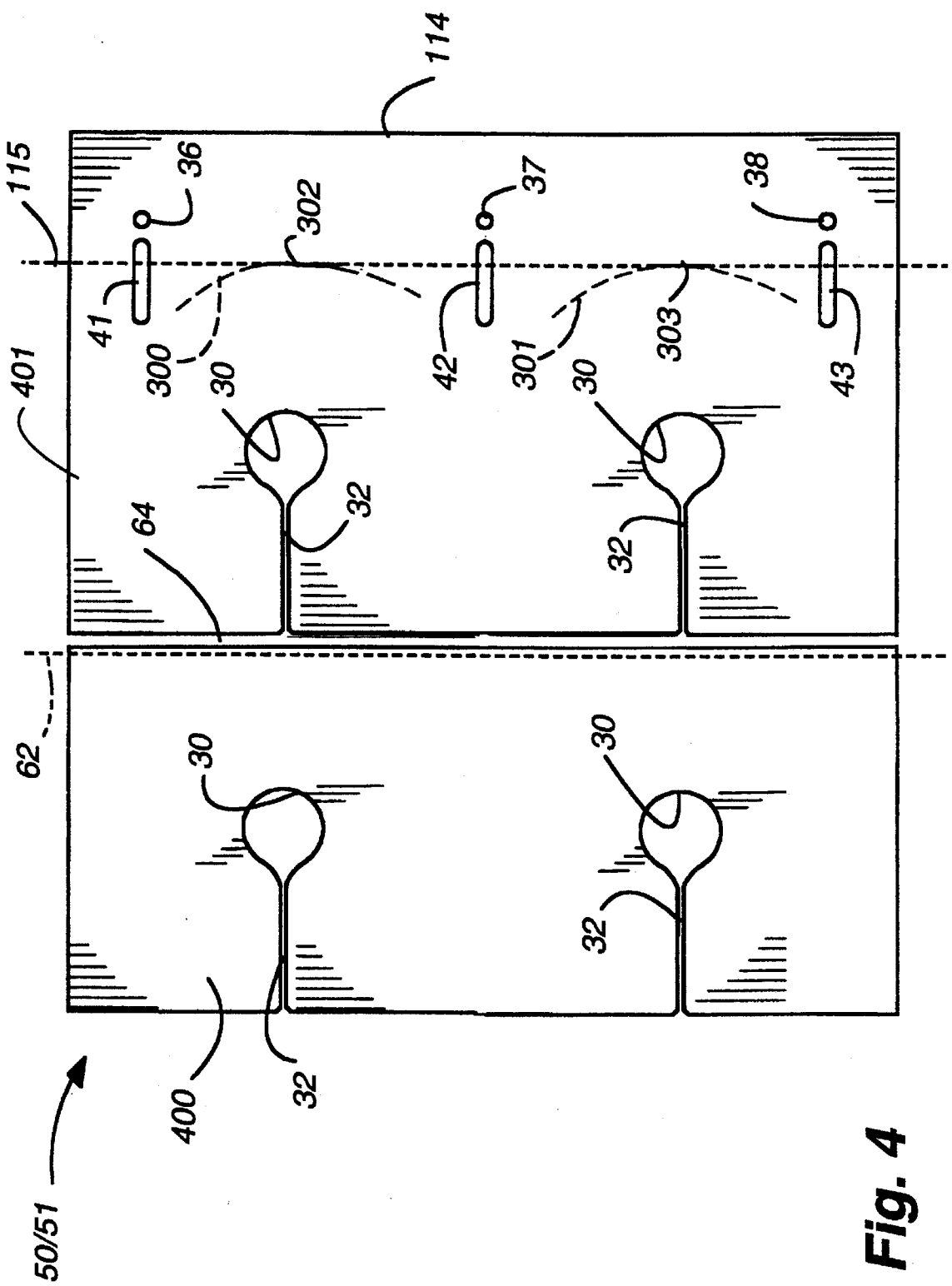
FIG. 4 is a plan view similar to FIG. 3 showing another embodiment of the two transparent outer sheets that comprise the page of FIG. 1, wherein each of the two outer sheets is formed from a two member assembly.

FIG. 4 is a plan view similar to FIG. 3 that shows another embodiment of the two rectangular and transparent outer sheets 50, 51 that comprise the exterior layers of storage page 10 of FIG. 1. In this embodiment of the invention, each of the two outer layers or sheets 50, 51 is formed as a two-member, or two web, assembly 400, 401.

With reference to FIGS. 1, 2 and 3, and as will be apparent from a following description of the heat seal procedure for CD storage page 10, a heat seal line pattern operates to bind the three members 50, 51, 52 of FIG. 2 together in order to form the unitary assembly of a CD storage page 10 in accordance with FIG. 1.

In the single sheet or web embodiment of outer sheets 50, 51 that is shown in FIG. 3, a linear heat seal line is positioned closely to the left of vertical CD insertion/removal axis 62; for example, at axis 162. In this FIG. 3 embodiment of the invention, the horizontal distance 63 between axes 62 and 162 was about 0.063-inches.

In the two-member or two-web embodiment of outer sheets 50, 51 that is shown in FIG. 4, each outer sheet 50, 51 comprises a first sheet member, or web 400, and a second sheet member or web 401. While the two sheet members 400, 401 function as a single member, as was described above relative to FIG. 3, they are separated by a small linear gap 64. Gap 64 performs the disc-insertion/disc-removal function that cuts 60, 61 of FIG. 3 perform for CD storage pockets 22, 23. In FIG. 4, heat seal line 62 remains in the same physical page position, as is shown in FIG. 3, but sheet member or web 401 is of slightly reduced horizontal width so as to provide for the presence of a vertically CD insertion/removal slot at the left hand side of each of the inner CD storage pockets 22, 23.

This reduction in horizontal width of sheet member 401 results in somewhat less critical manufacturing tolerance in the placement of a heat seal line 62 during the heat seal manufacturing step, and also provides each of the two inner CD storage pockets with a vertically extending CD insertion/removal slot.

Figure 5:
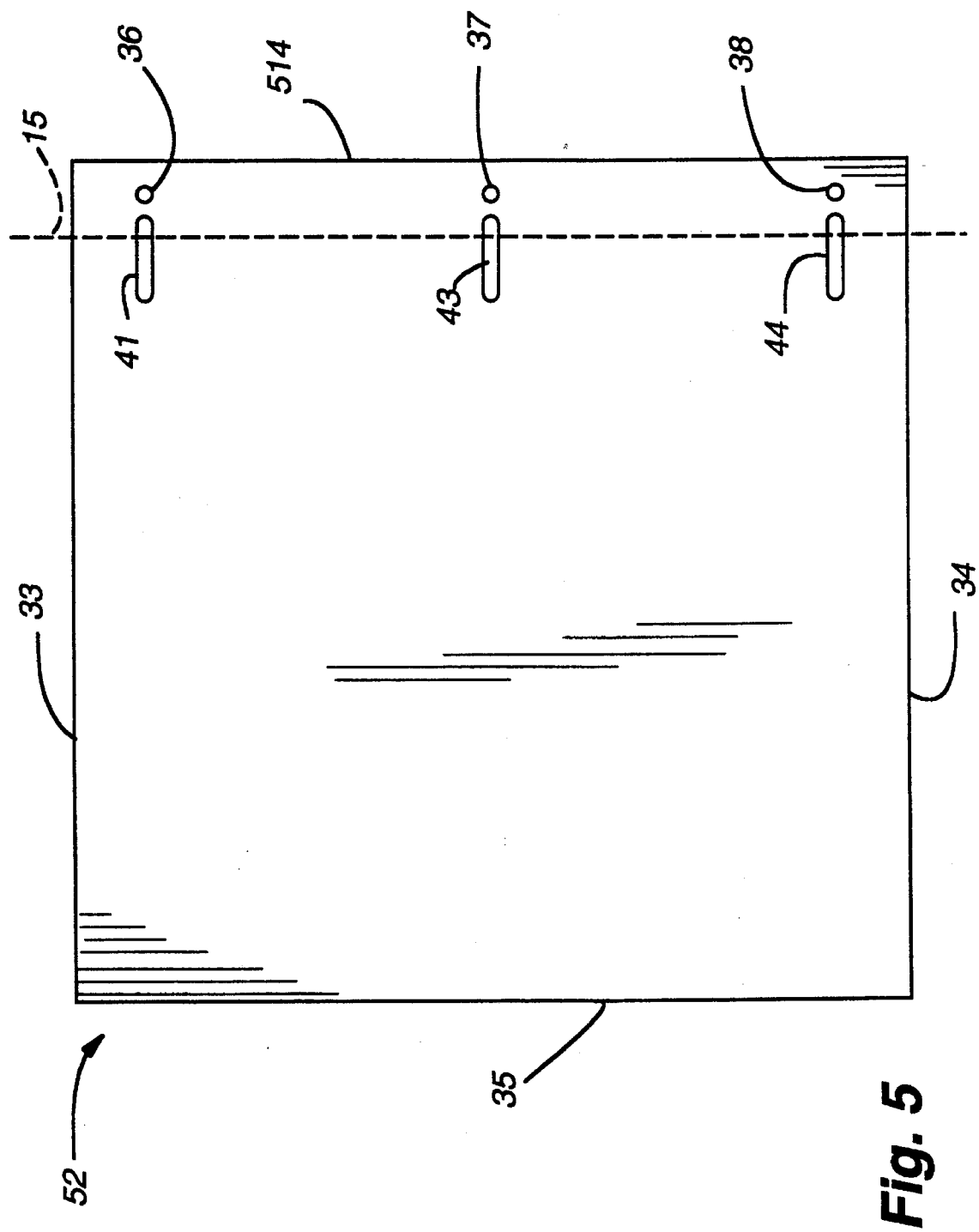
FIG. 5 is a plan view similar to FIG. 1A showing the three-ply opaque middle sheet of the invention, and showing the three-ring binder openings that are formed in this middle sheet.

FIG. 5 is a plan view similar to FIGS. 1, 3, and 4 that shows the three-ply opaque and rectangular shaped middle sheet 52 of CD storage page 10 that is shown in the plan view of FIG. 1. As can be seen from this figure, middle sheet 52 contains only the six binder openings or through holes 36–38 and 41–43. As noted above, it may be desirable to punch these six binder openings 36–38 and 41–43 after the binder page has been assembled into a unitary assembly by operation of a heat sealing process.

In an embodiment of the invention, middle sheet 52 was somewhat smaller in the horizontal dimension than were outer sheets 50, 51. As a result, the upper and lower edges 33, 34, as well as the left hand edge 35, of middle sheet 52 were located coincident with the similar numbered edges of FIG. 1's CD storage page 10. However, the right hand edge 514 of middle sheet 52 was located at about the location of axis 515 shown in FIG. 1 that is just to the right of circular binder holes 36–38.

Figure 6:
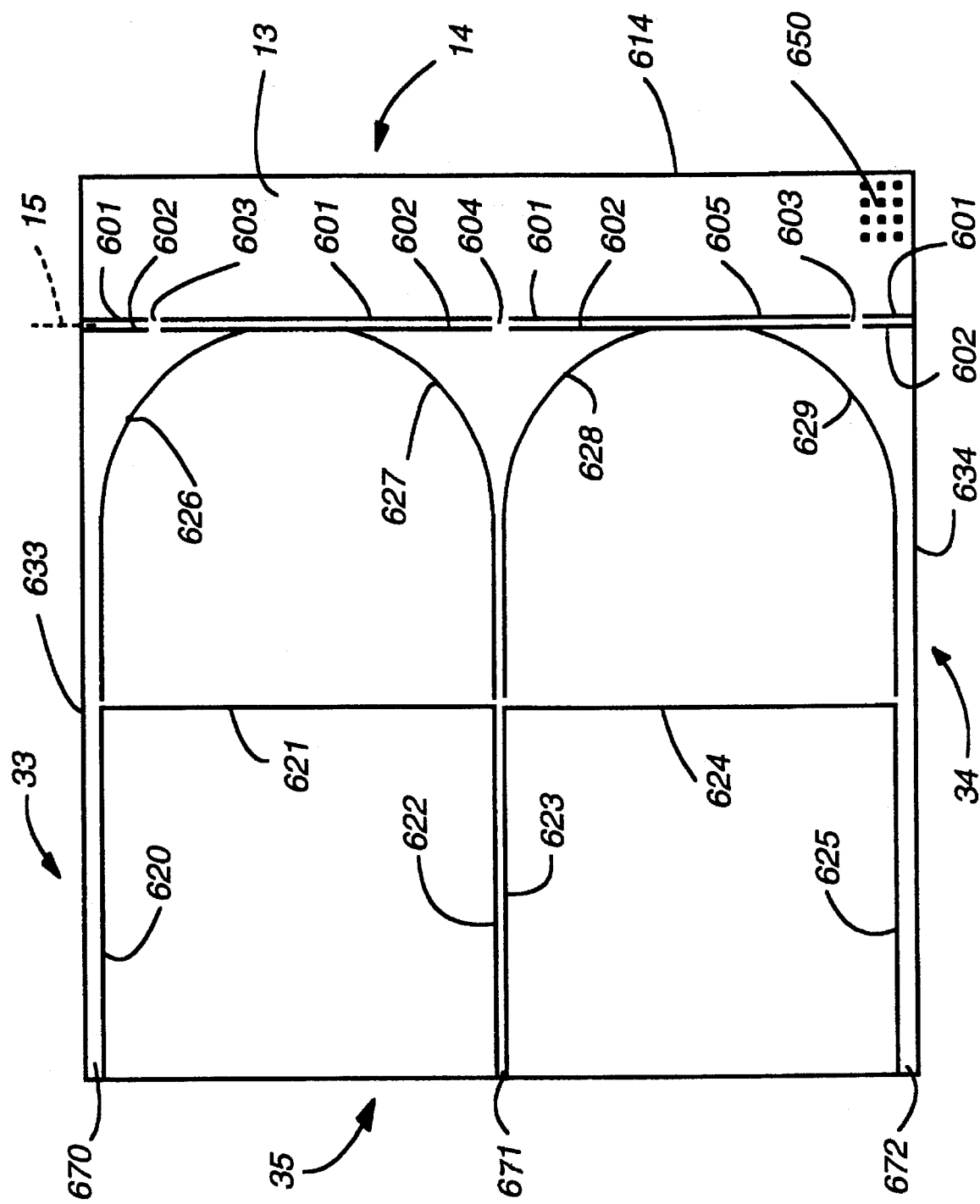
FIG. 6 is a plan view similar to FIG. 1A showing the line-type, double bar, heat sealing pattern that is used to bind two outer sheet, as shown in FIG. 3, and one middle sheet, as shown in FIG. 3, into the unitary page assembly shown in FIG. 1, this figure also showing how a fold line is formed in the resulting page by operation of a deep heat seal line.

FIG. 6 is a plan view similar to FIG. 1 that shows a line-type heat sealing pattern that is used to bind two outer sheets 50, 51 of FIGS. 2, 3 and 4 and one middle sheet 52 of FIGS. 2 and 5 into the unitary CD storage page assembly 10 that is shown in FIG. 1. FIG. 6 also shows how the page's deep fold line 15 is formed in the resulting page 10 by operation of a double heat seal line 601, 602. For the purpose of orienting FIG. 6 to FIG. 1, the four orthogonal edges 14, 33, 35, 34 of CD storage page 10 are shown in FIG. 6.

The specific manufacturing process for performing the heat sealing of two outer sheets 50, 51 and a single middle sheet 52 into a unitary page assembly 10 is not critical to the invention. Since this manufacturing procedure is well known to those of skill in the art, it will not be described in detail herein.

As a first step in the assembly of the three FIG. 2 page members 50, 52, 51 into the unitary CD storage page assembly 10 that is shown in FIG. 1, the three page members 50, 52, 51 are brought into rectangular alignment. For example, three running webs, one outer web containing outer sheets 50, an inner web containing middle sheets 52, and a second outer web containing outer sheets 51 are brought into running alignment. With the three page members 50, 52, 51 accurately held in this aligned position, heat seals are now used to seal the three members together into a unitary page assembly 10. Thereafter, and while in web form, the above-described through holes 36–38 and 41–43 are accurately punched in each individual CD storage page 10 that is within the web.

The outer page edges 14, 33, 34 are each provided with a heat seal line 633, 614, 634 that is located generally coincident with page edges 14, 33, 34, respectively.

In addition, fold line 15 is formed by a pair of deep and closely spaced and linear heat seal lines 601, 602 that are individually spaced on opposite sides of fold line 15, and individually extend generally parallel to heat seal line 614 and page edge 14. As shown, gaps 603, 604, 605 accommodate the location of elongated holes 41, 42, 43 within page 10.

CD storage pockets 20, 21 are formed by, and bounded by, linear heat lines 620, 621, 622 and 623, 624, 625, respectively, whereas CD storage pockets 22, 23 are formed by, and bounded by, linear/circular heat seal lines 626, 627 and 628, 629, respectively.

While the left hand page edge 35 may not include a heat seal pattern, if desired, three linear heat seal lines 670, 671, 672 may be provided generally coincident with the portions of page edge 35 that do not form the disc insertion/removal portion of CD storage pockets 20, 21.

As a feature of the invention, the page area that is occupied by flap 13 of page 10, which is also identified by numeral 13 in FIG. 6, may be provided with a heat seal pattern (for example, a pattern of dots or a cross hatch pattern as is indicated at 650) in order to secure the three page members 50, 52, 51 together in a selected portion of, or in the entire area of, flap 13. In addition, it is within the spirit and scope of the invention to use such a heat seal pattern in other non-CD-storage areas of page 10.

It should be understood that heat seal lines 621, 624 are located to the left of cuts 60, 61 (see FIG. 3) that are formed in outer sheets 50, 51. Thus, access to the two CD storage pockets 22, 23 (see FIG. 1) that are on the two sides of CD storage sheet 10 is not obstructed.

As stated previously, in the FIG. 4 embodiment of the invention wherein the two rectangular and transparent outer sheets 50, 51 that comprise the two exterior layers of storage page 10 are each formed as a two web, assembly heat seal lines 621 and 624 remain in the same physical page position as is shown in FIG. 6, but the web from which inner CD storage pockets 22, 23 are formed is of slightly reduced horizontal width, so as to provide for the presence of a vertically CD insertion/removal slot at the left hand side of each of the inner CD storage pockets 22, 23, and to the right of heat seal line 621, 624. This reduction in horizontal width of this sheet web results in somewhat less critical manufacturing tolerance in the placement of heat seal line 621, 624 during the FIG. 6 heat seal manufacturing step, while at the same time providing each of the two inner CD storage pockets 22, 23 with the required vertically extending CD insertion/removal slot.

A new and unusual feature of this invention is the manner in which the three circular holes 36–38, the three elongated holes 41–43, and the linear fold line 15 of a CD storage page 10, in accordance with this invention, cooperate with a standard three-ring binder to facilitate mounting of the generally 10.25-inch (vertical) by 11.366-inch (horizontal) CD storage page 10 in a standard three-ring binder whose corresponding size profile, when closed, is about 11.5-inches by 10.5-inches.

FIG. 7 is a side view of the horizontal edge of an open and standard size three-ring binder 700, wherein one CD storage page 10 in accordance with FIG. 1 is positioned, or located, in an elevated vertical position directly over the three open binder ring mating pair 704, 705. In FIG. 7, dimension 706 is about 10.5-inches.

FIG. 7 shows the two binder covers 701, 702 in the well-known open and flat position, with centrally located binder portion or edge 703 being exposed. CD storage page 10 is located so that its three circular holes 36–38 are in vertical alignment with the right hand portions 704 of the three binder rings, and with the page's three elongated holes 41–43 in vertical alignment with the left hand portions 705 of the three binder rings. As can be seen, the page's fold line 15 is now positioned intermediate binder portions 704, 705, page 10 not being folded on its fold line 15 in this figure.

Figure 8:
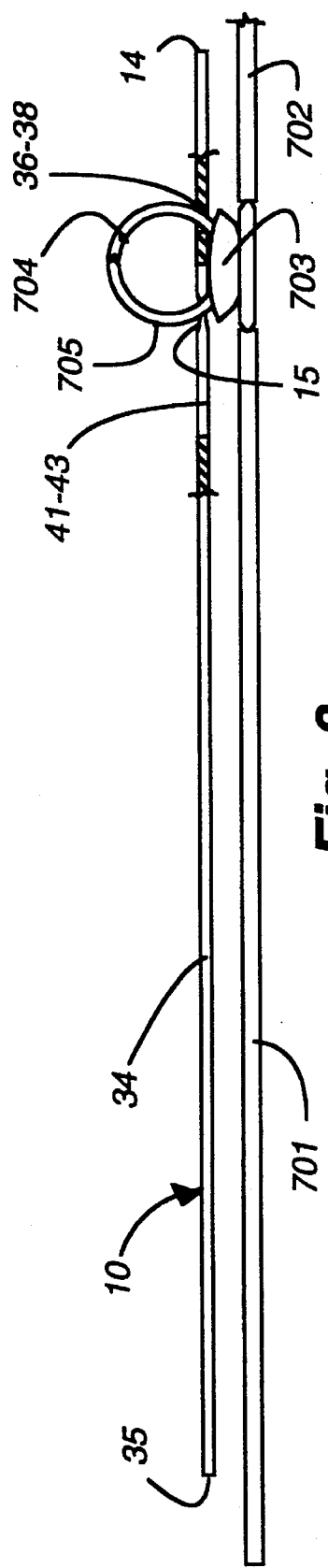
FIG. 8 is a view like FIG. 7 that shows the CD storage page of FIG. 1 lowered onto the three binder rings, and with the binder rings closed.

FIG. 8 is a view similar to FIG. 7 that shows CD storage page 10 lowered onto the three binder rings 704, 750, with binder rings 704, 705 then being manually closed in the well-known manner, but prior to the folding of CD storage page 10 on its fold line 15, and prior to closing binder covers 701, 702. As shown in this figure, the page's fold line 15 is now encircled by the three closed binder rings 704, 705, the three circular holes 36–38 of page 10 contain or accommodate the three ring portions 704, and the three elongated holes 41–43 of page 10 contain or accommodate the three-ring portions 705.

Figure 9:
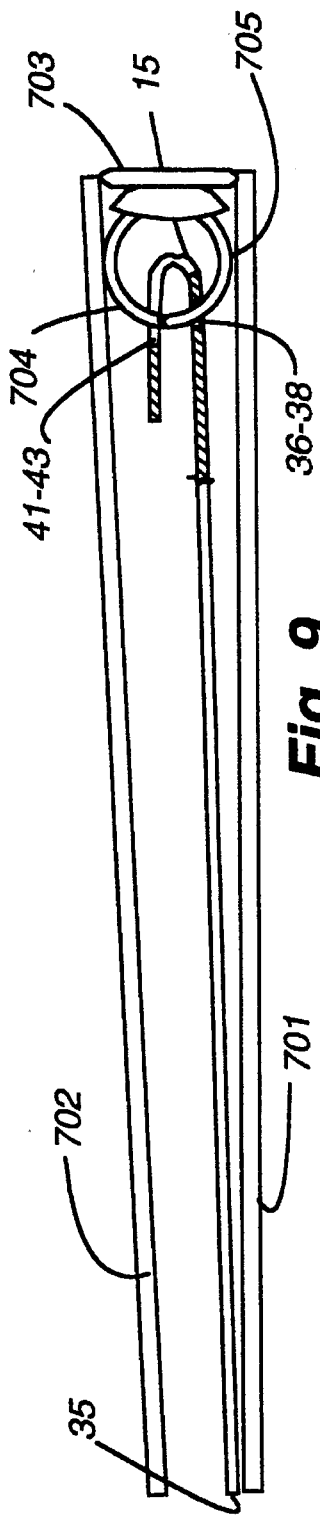
FIG. 9 is a view like FIG. 8 that shows the CD storage page in its folded state, such that the three-ring binder can be closed, as shown in both FIG. 9 and FIG. 7A.
Figure 16:
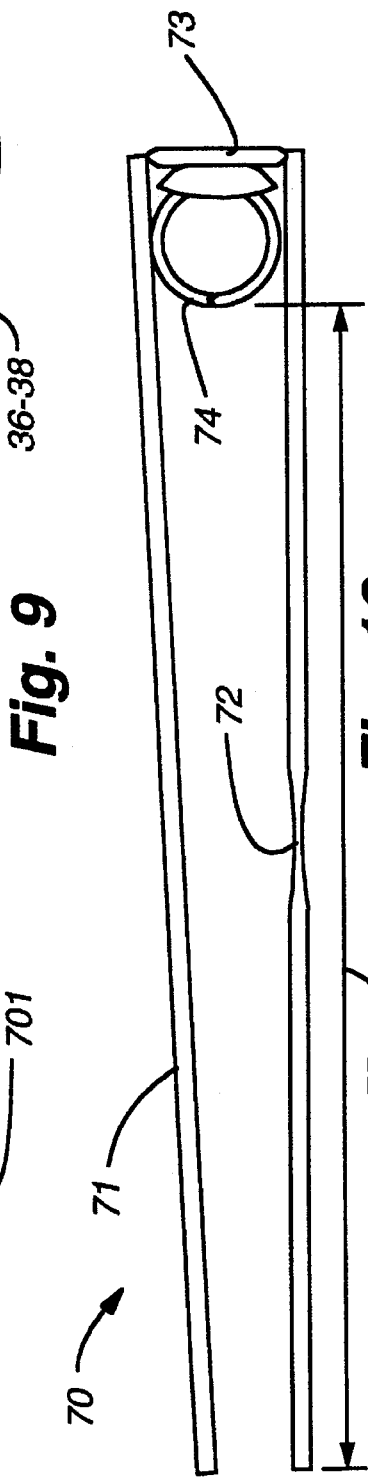
FIG. 16 is an end view of a well-known standard size three-ring binder having two covers that are hinged on a binder edge that carries three openable metal rings.

In practice, and as shown in FIG. 9, binder page 10 is first folded on its fold line 15, whereupon the left hand end of elongated openings 41–43 are brought into alignment with circular openings 36–38. Folded binder page 10 is then lowered onto open three-ring binder member 705, and the rings 704, 705 are then closed. This operation is shown in FIG. 7A.

FIG. 9 is a view similar to FIG. 8 that shows CD storage page 10 after it has been folded along its fold line 15, whereupon the three ring binders 704, 705 are closed, and the binder covers 701, 702 are thereafter closed, as shown. Note that page 10 can be folded upward, as is shown in FIG. 9, or the page can be folded downward, as is desired by the user.

This folding of page 10 on its fold line 15 is enabled by virtue of the page movement that is provided by the page's three elongated holes 41–43. As a result of this page movement within binders 701, 702, 703, the page's fold line 15 moves toward binder portion 703, and this movement operates to pull the page's left hand edge 35 to the right, to a position that is within the confines of closed binder covers 701, 702.

Figure 10:
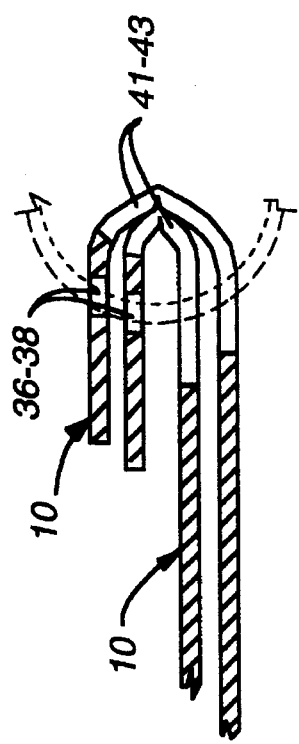
FIG. 10 is an enlarged view of the binder side of two CD storage pages of FIG. 1 showing how the two storage pages are nested together and folded as a unit to accommodate mounting in a standard size ½-inch or a 1-inch thick three ring binder.

FIG. 10 is an enlarged view of the binder side of two CD storage pages 10 of FIG. 1, showing how the two storage pages are nested together, and folded as a unit to accommodate mounting in a ½ or a 1-inch size or thickness three-ring binder.

Figure 11:
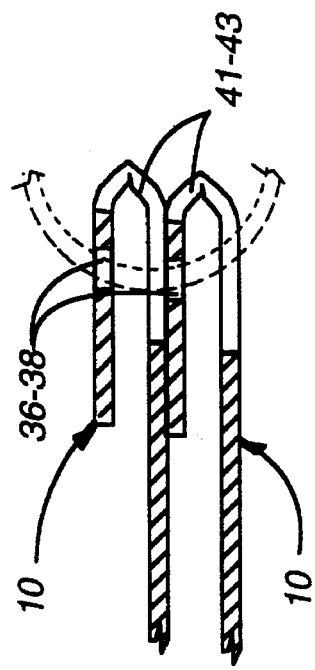
FIG. 11 is an enlarged view similar to FIG. 10 that shows the binder side of two CD storage pages of FIG. 1, showing how the two storage pages are placed one on top of the other and individually folded to accommodate mounting in a standard size 1 ½-inch, 2-inch, or a 3-inch thick three-ring binder.

FIG. 11 is an enlarged view similar to FIG. 10 that shows the binder side of two CD storage pages 10 of FIG. 1, showing how the two storage pages are placed one on top of the other, and individually folded to accommodate mounting in the larger size or thickness three-ring binders.

Figure 12:
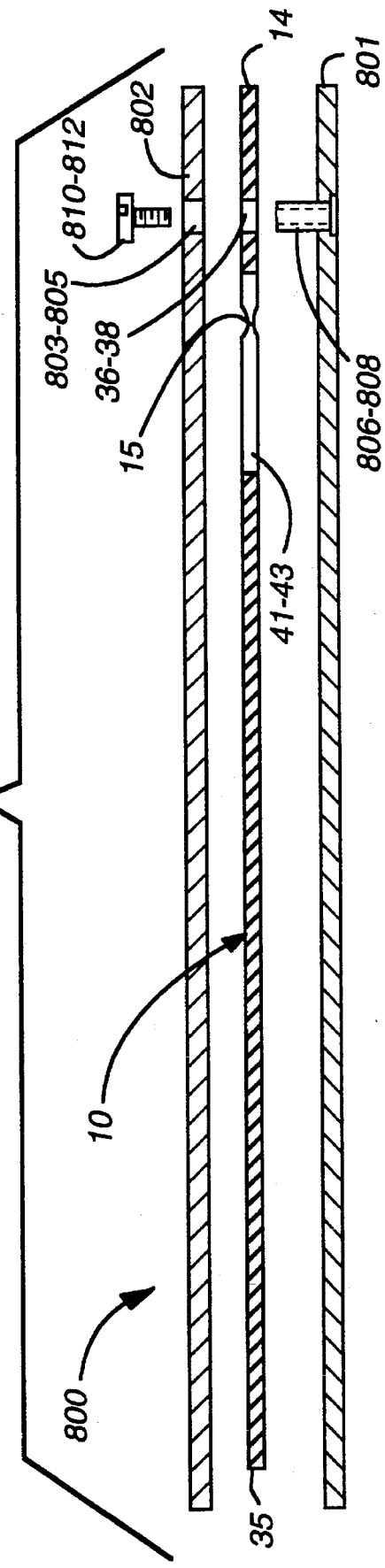
FIG. 12 is a side view similar to FIGS. 8 and 9 that shows how a CD storage page in accordance with the FIG. 1 embodiment mounts in a Chicago-posted binder without the need to fold the CD storage page.

FIG. 12 is a side view similar to FIGS. 8 and 9 that shows how a CD storage page 10 in accordance with FIG. 1 utilizes its three circular holes 36–38 to mount page 10 on the three upstanding posts 806–809 of a well-known Chicago-posted binder 800, without the need to fold CD storage page 10. In this utility of the invention, binder posts 806–809 are fixed to lower binder cover 801, and once a number of pages 10 have been mounted on posts 806–809, the binder's top cover 802, having three holes 803, 805 located therein, is lower unto posts 806–809, whereupon cover 802 is secured by operation of three threaded fasteners 810–812. Note that in this utility of the invention, CD storage page 10 need not be folded along its fold line 15, since the covers 801, 802 of Chicago-posted binder 800 are large enough to accommodate the 10.25-inch (vertical) by 11.366-inch (horizontal) size profile of CD storage page 10.

Figure 13:
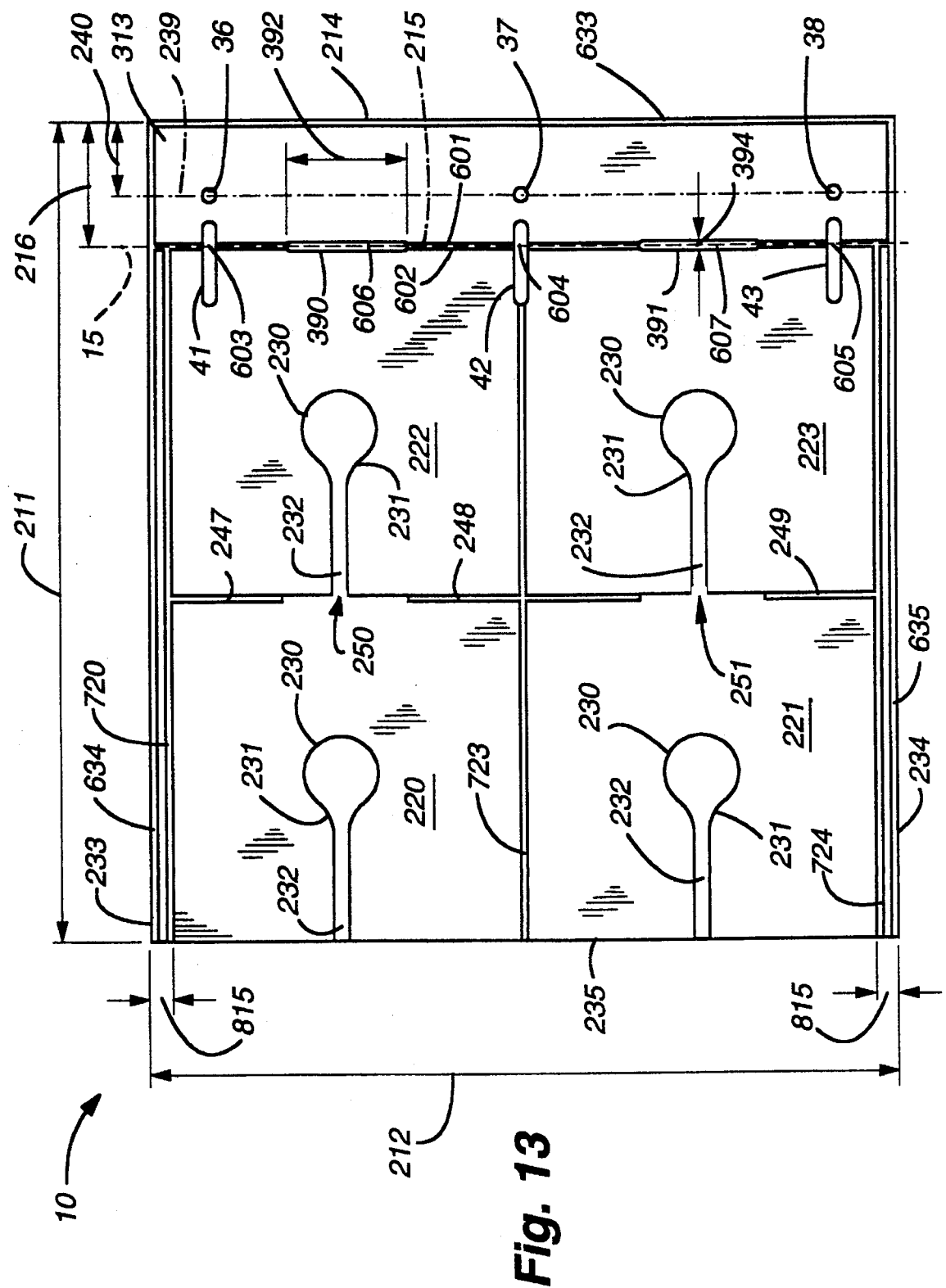
FIG. 13 is a plan view of another folding embodiment of a loose leaf, two-sided, CD storage page in accordance with the invention, this page being usable to store a number of compact discs (CDs) within a thin, flexible, multi-ply page, so as to provide physical and visual access to eight CDs, wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 13.

FIG. 13 is a plan view of another embodiment of a loose leaf, two-sided, CD storage page 10 in accordance with the invention. Storage page 10 of FIG. 13 is again usable to store eight CDs within a thin, flexible, multi-ply three-ring binder page or sheet 10. Page 10 provides physical and visual access to eight CDs that are housed within the four above-described CD storage pockets 220–223 that are located on each side of the page, or page 10 may optionally provide physical and visual access to four CDs and the printed/ graphic information that relates to the four CDs, in which case, two CDs and their printed/graphic information are held in the four storage pockets that are on each side of page 10. The opposite side plan view of this embodiment of CD storage page 10 is a mirror image of FIG. 13.

In this embodiment of the invention, the horizontal width 211 of rectangular page 10 was about 11.147265-inches, and the vertical height 212 of page 10 was about 10.25-inches. Page 10 includes a mounting flap 213 that is defined by vertically extending right hand page edge 214 and a vertically extending, six-piece or segment, heat seal fold line 215 that extends generally parallel to page edge 214. Again, fold line 215 comprises the above-mentioned deep heat seal. In this embodiment of the invention, the horizontal width 216 of flap 213 was about 1.585-inch.

Page 10 includes a horizontally extending upper page edge 233 and a horizontally extending lower page edge 234 that is parallel to page edge 233. As will be apparent, page edges 233, 234 are defined by two horizontally extending and parallel heat seal lines 634, 635, respectively. In this embodiment of the invention, the page's vertically extending left hand edge 235 extends generally parallel to both deep fold line 215 and right hand page edge 214, and page edge 235 was not heat sealed by a vertical heat seal line.

Each flat and generally planar side of page 10 includes four one-CD storage pockets 220, 221, 222 and 223 that are arranged in a square matrix comprising two horizontal pocket rows 220, 222 and 221, 223, and two vertical pocket columns 220, 221 and 222, 223. All four CD storage pockets 220–223 have a square shape, about 4.7355-inch on each side as measured mid-seal to mid-seal, for holding one CD. As will be apparent, the bounds of CD storage pockets 220–223 are defined by multi-function heat seal lines that are used to seal the multiple plies or sheets 50, 51, 52 (see FIG. 2) of page 10 together.

In this embodiment of the invention, the horizontal spacing that exists between the two upper CD storage pockets 222 and 220, and the horizontal spacing that exists between the two lower CD storage pockets 221, 223 is very small, and is defined by a three-piece, vertically extending and aligned, heat seal line 247, 248, 249.

The spaces, or gaps, 250, 251 that exist in heat seal line 247, 248, 249 allow horizontal movement to the right of the two CDs that are stored in storage pockets 220, 221, respectively, and in fact it is possible that the adjacent circumferential edges of the CDs that are stored in storage pockets 220, 222 and 221, 223 may physically engage as a result of gaps 250, 251. The extent of such horizontal movement of the CDs within storage pockets 220, 221 can be controlled by varying the vertical length or size of gaps 250, 251. If desired, and by the use of this technique, physical engagement of the adjacent edges of the two CDs within outer storage pockets 220, 222 with the edges of the two CDs within inner storage pockets 221, 223 can be prevented.

Each of the four CD pockets 220–223 that exist on each side of page 10 includes a centrally disposed and circular finger opening 230 that is about 1-inch in diameter. The left hand side of each finger opening 230 is formed to have a tear-drop shaped extension 231 having two vertically opposed sides that are each formed about a 0.5-inch radius. The left hand side of each of the four tear-drop extensions 231 terminates at a thin horizontally extending slot 232 that is about 0.25-inch in vertical height. Preferably, slots 232 extend parallel to horizontal page edges 233, 234.

As stated, the unique configuration of finger hole 230 and slot 232 provide access to a CD in a storage pocket, while at the same time preventing CDs on one page from being scratched by CDs on an adjacent page, thus minimizing the likelihood of CD damage due to scratching and the like.

In this embodiment, finger opening 230, tear-drop shaped extension 231, and horizontal slot 232 can also be replaced by slot 1000 of FIG. 1B having a vertical height 1001 generally equal to, but not exceeding, 0.50-inch.

The right hand binder portion of page 10 includes three circular through-holes 36, 37, 38 that are each about 0.1875-inch in diameter. Circular holes 36–38 lie on a common vertical axis 239 that extends generally parallel to page edge 214 and is offset a distance 240 from page edge 214. In this embodiment of the invention, distance 240 was about 1.03125-inches. The three circular binder holes 36–38 are generally centered on the vertical height of page 10, and in this embodiment of the invention, holes 36 and 38 were offset a distance of about 0.844-inch inward from the page's upper and lower edges 233, 234, respectively. In this embodiment of the invention, central hole 37 was spaced a distance of about 4.250 to about 4.281-inch from each of the two holes 36 and 38.

The right hand portion of page 10 also includes three horizontally extending and elongated through-holes 41, 42, 43. The three elongated holes or slots 41–43 are each about 0.1875-inch in vertical height, and are each about 0.875-inch in horizontal length as measured from center-to-center of the two end semicircle portions of slots 41–43. The two horizontal ends of each elongated hole 41–43 preferably terminate at a semicircle or radius surface; for example, a circle having a radius of about 0.09275-inch. As can be seen from FIG. 13, each of the three elongated holes 41–43 is in horizontal alignment with an individual one of the three circular holes 36–38. Elongated holes 41–43 are also vertically aligned so that each of the holes 41–43 is equally horizontally spaced from circular holes 36–38, and from the page's right hand edge 214.

A feature of the invention provides that elongated holes 41–43 are positioned so that the center of the semicircle, or radius that is located at the left hand end of each hole 41–43, is located a distance that is about 0.625-inch to the left of fold line 215.

A feature of the embodiment of the invention, shown in FIG. 13, eliminates CD-movement-cuts 302, 303 that are shown in FIG. 4, and substitutes therefor a pair of elongated and vertically aligned through slots 390, 391 that extend through page 10. Through slots 390, 391 are vertically aligned on fold line 15. In this embodiment of the invention, both of the slots 390, 391 had a vertical height 392 of about 1.50-inch, and had a horizontal width 394 of about 0.625-inch. If desired, slots 390, 391 can be made vertically smaller in order to reduce the intrusion of a CD through a slot 390, 391. As shown, the vertical physical locations of slots 390, 391 are vertically centered on storage pockets 222, 223, respectively.

Through openings 390, 391 operate to accommodate horizontal movement to the right of the two CDs that are stored in pockets 222, 223, respectively. Here, also the extent of such horizontal movement of the CDs within storage pockets 222, 223 can be controlled by varying the vertical size of openings 390, 391.

In order to reduce the horizontal width 211 of CD storage page 10 shown in FIG. 13, the line-type heat sealing pattern that is used to bind two outer sheets 50, 51 of FIGS. 2, 3 and 4, and one middle sheet 52 of FIGS. 2 and 5 into the unitary CD storage page assembly 10 has been modified.

Again, a deep fold line 15 is formed in page 10 by operation of two vertically extending and parallel deep heat seal lines 601, 602 having gaps 603, 604, 605 formed therein to accommodate the location of elongated through holes 41, 42, 43. In addition, in this embodiment of the invention, deep heat seal lines 601, 602 include two additional gaps 606 and 607 that are formed therein to accommodate the location of the above mentioned elongated through slots 390, 391. As a result, heat seal lines 601, 602 are each made up of six vertically aligned segments.

The outer page edges 214, 233, 234 are each provided with a heat seal line 633, 614, 634 that is located generally coincident with page edges 214, 233, 234, respectively.

Square CD storage pockets 220, 221 are formed by, and bounded by, linear heat lines 720, 247, 248, 723 and 723, 248, 249, 724 respectively, whereas square CD storage pockets 222, 223 are formed by, and bounded by, heat seal lines 720, 602, 723 and 720, 602, 724, respectively. In this embodiment of the invention, the vertical spacing 815 of heat seal lines 720, 724 from upper page edge 233 and lower page edge 234, respectively, was about 0.25-inch.

Note that in this embodiment of the invention, a reduction in horizontal page size is achieved by virtue of the fact that one of the two vertical fold-producing deep heat seal lines 602 is also used as a vertical pocket boundary of inner pockets 222, 223. More specifically, in this embodiment of the invention, the right hand vertical boundary of the two inner square CD storage pockets 222, 223 is formed by fold-producing, six-piece, heat seal line 602.

As a feature of the invention, the page area that is occupied by flap 213 of page 10 may be provided with a heat seal pattern; for example, a pattern of dots or a cross hatch pattern 650 of FIG. 6, in order to secure the three page members 50, 52, 51 of FIG. 2 together in a selected portion of, or in the entire area of, flap 13. In addition, it is within the spirit and scope of the invention to use such a heat seal pattern in other non-CD-storage areas of page 10.

It is to be understood that the FIG. 13 embodiment of the invention also utilizes the multiple ply construction and arrangement above described relative to FIG. 2, and may include either a single inner and outer transparent sheet, as described relative to FIG. 3, or an inner/outer sheet construction and arrangement like FIG. 4 wherein the two outer sheets are formed from a two member or web assembly.

Figure 14:
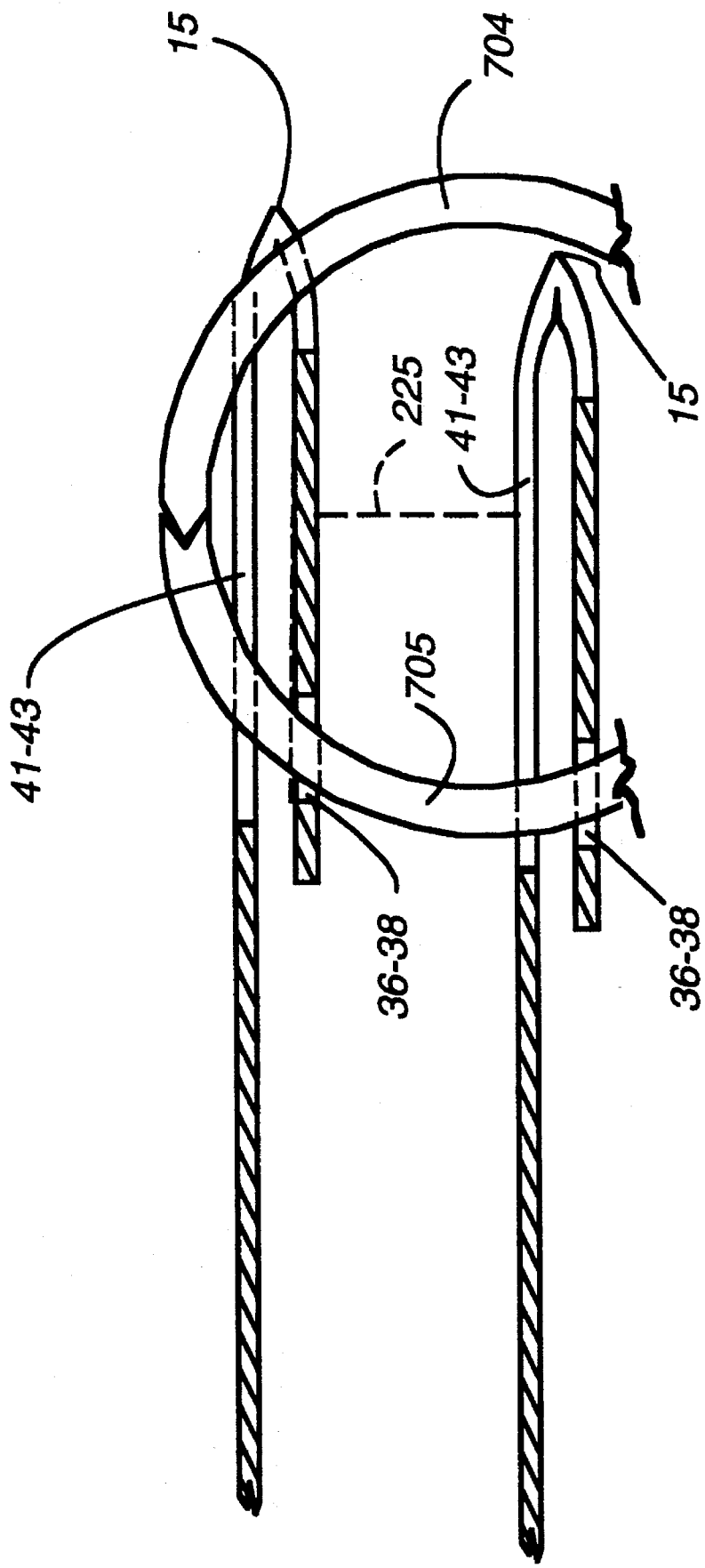
FIG. 14 shows the new and unusual utility of the circular through holes and the elongated through slots that are provided in CD storage pages in accordance with embodiments of the invention, this figure showing how the three folded through slots provide for a noninterfering acceptance of the right hand ring member when a three-ring binder is substantially filled with of a number of CD storage pages in accordance with the invention.

FIG. 14 shows a new and unusual utility of circular through holes 36–38 and elongated through slots 41–43 when a three-ring binder is substantially filled with a number of CD storage pages 10 in accordance with the invention. FIG. 14 is an enlarged edge view that is similar to FIG. 7. In FIG. 14, a stack of a number of CD storage pages 10 pages is designated by broken line 225, only the top and bottom page 10 of which are shown in detail.

Each page 10 within stack 225 is folded on its fold line 15. The upper page, or pages, 10 are shown as occupying a narrowing and generally circular area or spacing that is defined by the two mating portions 704, 705 of a closed three-ring binder.

All of the pages 10 within stack 225 are secured to the closed three rings by operation of the three circular holes 36–38, and the left hand end of the three elongated slots 41–43 that are provided in each page. The folding of the top page, or pages 10 on the fold line 15, has had the effect of providing an open slot or gap 41–43 that is coincident with the page's fold line 15. This open slot 41–43 provides a noninterfering acceptance of right hand ring member 704. It is noted that the lower page, or pages 10 also are provided with an open slot 41–43 that is formed by the folding of elongated slots 41–43 on fold line 15. However, fold line 15 of these lower sheets 10 does not physically hit or interfere with binder member 704 at the wider and generally circular area or spacing that exists adjacent to the binder edge 703 (see FIG. 8) of the three-ring binder.

Figure 15:
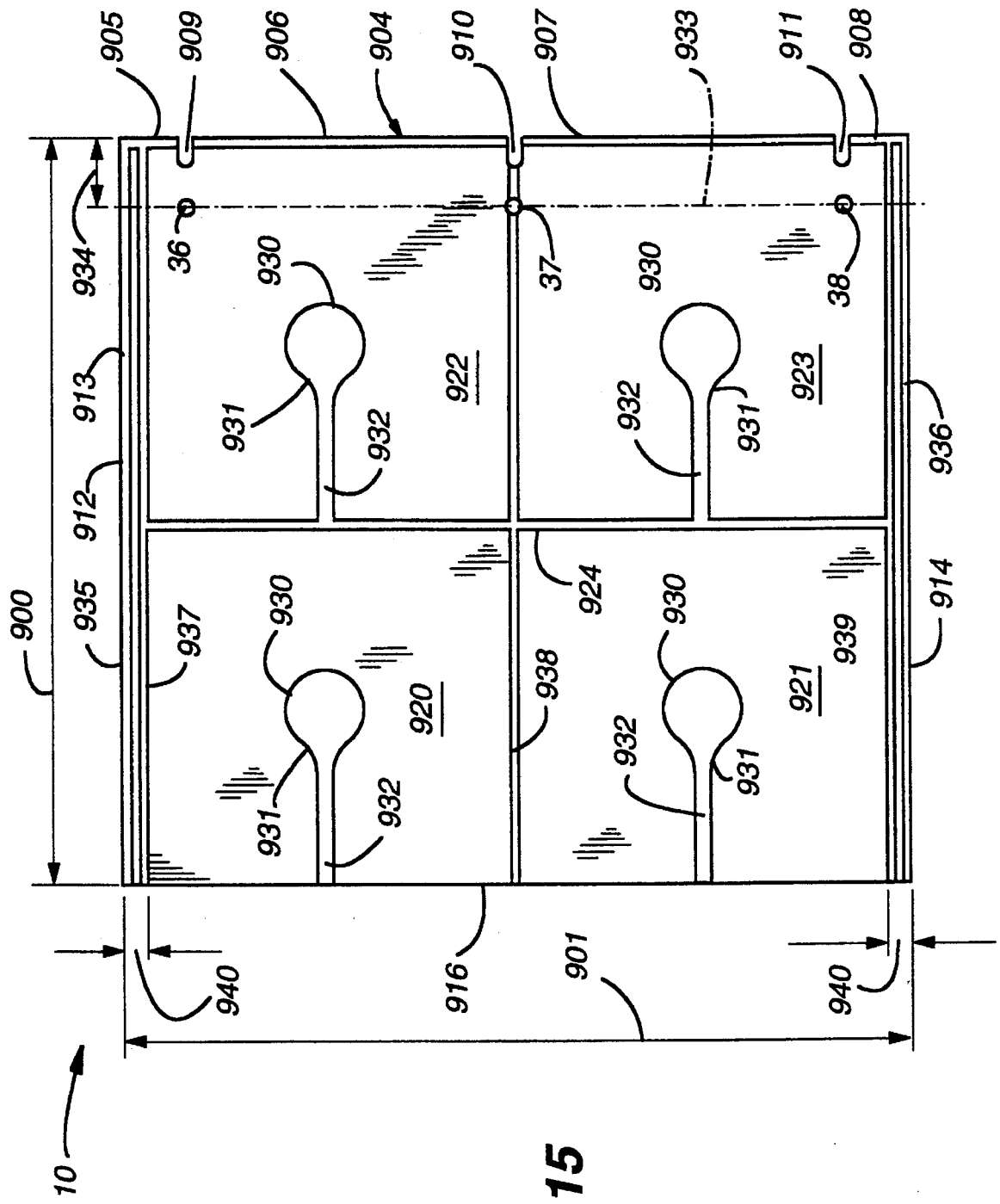
FIG. 15 is a plan view of a nonfolding embodiment of a loose leaf, two-sided, CD storage page in accordance with the invention that is intended for use in thin 1.0-inch binders, as well as in thicker 3.0 or 4.0-inch three-ring binders, this page being usable to store a number of compact discs (CDs) within a thin, flexible, multi-ply page, so as to provide physical and visual access to eight CDs wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 15.

FIG. 15 is a plan view of another embodiment of a loose leaf, two-sided, CD storage page 10 in accordance with the invention, page 10 being usable to store a number of compact discs (CDs) within a thin, flexible, multi-ply page (see FIG. 2), so as to provide physical and visual access to eight CDs, wherein four CDs are held on each side of page 10, or to provide physical and visual access to four CDs and the printed/graphic information that relates to the four CDs, in which case, two CDs and their printed/graphic information are held on each side of page 10, the opposite side plan view of page 10 being a mirror image of FIG. 15.

In this embodiment of the invention, the horizontal width 900 of rectangular page 10 was about 9.625-inches, and the vertical height 901 of page 10 was about 10.25-inches. Page 10 of this embodiment of the invention does not include a foldable mounting flap at its vertically extending right hand page edge 904.

Rather, the vertical binder edge 904 of page 10 is provided with a four-piece linear heat seal 905–908 and with three horizontally extending slots or notches 909–911, each notch of which functions as was described relative to FIG. 14 when a binder page 10 occupies the top of a stack of sheets 225 that substantially fill a three-ring binder.

Page 10 includes a horizontally extending upper page edge 912 that is coincident with a linear heat seal line 913, and horizontally extending lower page edge 914 is coincident with linear heat seal line 915. In this embodiment of the invention, the page's vertically extending left hand edge 916 extends generally parallel to right hand page edge 904, and edge 916 was not heat sealed by a vertical heat seal line.

Each flat and generally planar side of page 10 includes four one-CD storage pockets 920, 921, 922 and 923 that are arranged in a square matrix comprising two horizontal pocket rows 920, 922 and 921, 923, and two vertical pocket columns 920, 921 and 922, 923. All four CD storage pockets 920–923 have a square shape, about 4.7355-inch on each side, for holding one CD in each of the storage pockets. As will be apparent, the bounds of CD storage pockets 920–923 are defined by multifunction heat seal lines that are used to seal the multiple plies or sheets 50, 51, 52 (see FIG. 2) of page 10 together.

In this embodiment of the invention, the horizontal spacing that exists between the two upper CD storage pockets 920 and 922, and the horizontal spacing that exists between the two lower CD storage pockets 921, 923, is very small, and is defined by vertically extending heat seal line 924.

In this embodiment of the invention, there are no spaces, or gaps, in heat seal line 924 that allow horizontal movement to the right of the two CDs that are stored in storage pockets 920, 921, respectively.

Each of the four CD pockets 920–923 that exist on each side of page 10 includes a centrally disposed and circular finger opening 930 that is about 1-inch in diameter. The left hand side of each finger opening 930 is formed to have a tear-drop shaped extension 931 having two vertically opposed sides that are each formed about a 0.5-inch radius. The left hand side of each of the four tear-drop extensions 931 terminates at a thin horizontally extending slot 932 that is about 0.25-inch in vertical height. Preferably, slots 932 extend parallel to horizontal page edges 913, 914.

As stated, the unique configuration of finger hole and slot provide access to a CD in a storage pocket, while at the same time, minimizing the likelihood of disc damage due to scratching and the like.

As with previous embodiments of the invention, the constructions 930, 931, 932 can be eliminated, and the generally 0.50-inch high slot 1000 of FIG. 1B can be substituted therefor.

The right hand binder portion of page 10 includes three circular through-holes 36, 37, 38 that are each about 0.1875-inch in diameter. Circular holes 36–38 lie on a common vertical axis 933 that extends generally parallel to page edge 905–908, and is offset a distance 934 from page edge 905–908. In this embodiment of the invention, distance 934 was about 0.75-inches. The three circular binder holes 36–38 are generally centered on the vertical height of page 10, and in this embodiment of the invention, holes 36 and 38 were offset a distance of about 0.844-inch inward from the page's upper and lower edges 912, 914, respectively. In this embodiment of the invention, central hole 37 was spaced a distance of about 4.250 to about 4.281-inch from each of the two holes 36 and 38.

As stated, the right hand portion of page 10 also includes three horizontally extending and elongated through-slots 909–911. The notches or slots 909–911 are each about 0.1875-inch in vertical height, and are each about 0.344-inch in horizontal length, which horizontal dimension includes the semicircular right hand end of slots 909, 911. The two left hand horizontal ends of each elongated slot 909–911 preferably terminates at a radius surface; for example, a surface having a radius of about 0.09375-inch. As can be seen from FIG. 15, each of the three elongated slots 909–911 is in horizontal alignment with an individual one of the three circular holes 36–38. Elongated slots 909–911 are also vertically aligned so that each of the clots 909–911 is equally horizontally spaced from circular holes 36–38 and from the page's right hand edge 905–908.

An optional feature of the embodiment of the invention shown in FIG. 15 eliminates CD-movement-cuts 302, 303 that are shown in FIG. 4, and eliminates the vertically aligned through slots 390, 391 that are shown in FIG. 13.

The upper and lower page edges 912, 914 are each provided with a heat seal line 935, 936 that is located generally coincident with page edges 912, 914, respectively.

Square CD storage pockets 920, 921 are formed by, and bounded by, linear heat lines 937, 924, 938 and 938, 924, 939, respectively, whereas square CD storage pockets 922, 93 are formed by, and bounded by, heat seal lines 937, 905, 906, 938 and 938, 907, 908, 939, respectively. In this embodiment of the invention, the vertical spacing 940 of heat seal line 937 from upper page edge 912 and the vertical spacing of heat seal line 939 from lower page edge 914, respectively, was about 0.25-inch.

Note that in this embodiment of the invention, a reduction in horizontal page size is achieved by virtue of the fact that the heat sealed vertical binder edge of page 10 also forms a boundary of the inner column of CD storage pockets 922, 923, and open notches/slots 909–911 are provided in the binder edge of page 10, these open slots functioning as was described relative to FIG. 14.

It is to be understood that the FIG. 15 embodiment of the invention also utilizes the multiple ply construction and arrangement above described relative to FIG. 2, and may include either a single inner and outer transparent sheets, as described relative to FIG. 3, or an inner/outer sheet construction and arrangement like FIG. 4, wherein the two outer sheets are formed from a two member assembly.

As a feature of the invention, the FIG. 15 embodiment thereof may include the use of truncated vertical heat seal lines, as shown in FIG. 13, so as to provide a gap at the vertical right hand side of each of the outer CD storage pockets 920, 921, and/or so as to provide a gap at the vertical right hand side of each of the inner CD storage pockets 922, 923. As described previously, the use of these truncated vertical heat seal lines at these locations accommodates horizontal movement to the right of CDs with the CD storage pockets.

While this invention has been described in detail while making reference to preferred embodiments thereof, it is recognized that those skilled in the art, upon learning of this invention, will readily visualize yet other embodiments that are within the spirit and scope of this invention. Thus, this detailed description is not to be taken as a limitation on the spirit and scope of this invention.

What is claimed is:

1. A relatively thin and flexible three ring binder page for removably storing a plurality of compact discs, comprising;

a first transparent and flexible plastic sheet, a second flexible plastic sheet, and a third transparent and flexible plastic sheet., said three sheets being arranged in that order, said first, second and third sheets each having a generally similar rectangular shape whose vertical height generally conforms to the vertical height of a standard size three-ring binder cover, and whose horizontal width is somewhat larger than the horizontal width of a standard size three-ring binder cover, said first sheet, second and third sheets each having a horizontal top edge and a horizontal bottom edge that define said horizontal width, and having a vertical right hand side edge and a vertical left hand side edge that define said vertical height, a first three-sided heat seal binding said first sheet, second and third sheets together at said top edge, bottom edge, and right hand side edge, to thereby form a unitary flexible three ring binder page wherein said right hand side edge defines a binder edge of said binder page, four three-sided heat seals binding said first, second and third sheets together in a manner to define four single-disc storage pockets on each side of said binder page, said four single-disc storage pockets on each side of said page being arranged in two identical four-pocket generally square matrixes, each matrix having two storage pockets on each vertical side of said matrix, a first pattern of three vertically aligned and circular binder holes formed at a location that is spaced a first distance from said right hand side edge of said binder page, a second pattern of three vertically aligned and elongated binder holes individually extending in a horizontal direction and individually horizontally aligned with one of said three circular binder holes, said three elongated binder holes being formed at a location that is spaced a second greater distance from said right hand side edge of said binder page, and a linear and vertical heat seal fold line extending generally parallel to said right hand side edge of said binder page, and located to intersect said three elongated binder holes.

2. The three-ring binder page of claim 1 wherein said second sheet comprises;

an intermediate flexible and adhesive layer, and two outer flexible and soft plastic layers.

3. The three-ring binder page of claim 1 wherein;
said first and third sheets are polypropylene sheets, and said second sheet is an opaque three-ply sheet having an intermediate adhesive layer, and two outer layers of soft polypropylene.

4. The three-ring binder page of claim 3 wherein said two outer layers of soft polypropylene comprise nonwoven polypropylene having a weight of about 30 grams per square yard.

5. A three-ring binder page for removably storing up to four 4 ¾-inch diameter compact discs on each side of said binder page, said binder page comprising;
a first transparent and flexible plastic sheet, a second flexible plastic sheet, and a third transparent and flexible plastic sheet, said three sheets being arranged in that order,
said first, second and third sheets each having a generally similar rectangular shape whose vertical height is about 10.3-inch, and whose horizontal width is about 11.4-inch,
said first sheet, second and third sheets each having a horizontal top edge and a horizontal bottom edge that define said horizontal width, and having a vertical right hand side edge and a vertical left hand side edge that define said vertical height,
a first three-sided heat seal binding said first sheet, second and third sheets together at said top edge, bottom edge, and right hand side edge, to thereby form a unitary flexible three-ring binder page wherein said right hand vertical side edge defines a binder edge for said binder page,
four three-sided heat seals binding said first, second and third sheets together in a manner to define four single-disc storage pockets on each side of said binder page, each one of said storage pockets being of size to store one of compact disc therein,
said four single-disc storage pockets on each side of said page being arranged in two identical four-pocket matrixes, each matrix having two storage pockets on each side of said matrix,
a first pattern of three vertically aligned and circular binder holes formed at a location that is spaced about 0.6-inch from said right hand side edge of said binder page,
a second pattern of three vertically aligned and elongated binder holes that are each about 0.9-inches in horizontal length, that individually extending in a horizontal direction, and that are individually horizontally aligned with one of said three circular binder holes, said three elongated binder holes being formed at a location that is spaced to the left of said three vertically aligned and circular binder holes, and
a linear and vertical heat seal fold line extending generally parallel to said right hand side edge of said binder page, and located to intersect said three elongated binder holes, said heat seal fold line being located about 1.75-inch from said right hand side edge of said binder page.

6. The three-ring binder page of claim 5 wherein said second sheet comprises;
an intermediate flexible and plastic layer, and two outer flexible and plastic layers, said two outer plastic layers being formed of a soft plastic material.

7. The three-ring binder page of claim 5 wherein;
said first and third sheets are polypropylene sheets, and said second sheet is an opaque three-ply sheet having an intermediate adhesive layer, and two outer layers of soft polypropylene.

8. The three-ring binder page of claim 7 wherein said two outer layers comprise nonwoven polypropylene.

9. A three-ring binder page for removably storing a maximum of four CDs on each side of said binder page, said binder page comprising;
a first flexible plastic sheet, a second flexible plastic sheet, and a third flexible plastic sheet, said three sheets being arranged in that order,
said first, second and third plastic sheets each having a generally similar rectangular shape whose vertical height is about equal to the height of a standard three-ring binder, and whose horizontal width is somewhat greater than the width of a standard three-ring binder when in a closed position,
said first sheet, second and third sheets each having a horizontal top edge and a horizontal bottom edge that define said horizontal width, and having a vertical right hand side edge and a vertical left hand side edge that define said vertical height,
a first heat seal binding said first sheet, second and third sheets together at said top edge, bottom edge, and right hand side edge, to thereby form a unitary flexible three-ring binder page wherein said right hand vertical side edge defines a vertical binder edge for said binder page,
four three-sided heat seals binding said first, second and third sheets together in a manner to define four one-CD storage pockets on each side of said binder page,
said four one-CD storage pockets on each side of said page being arranged in two four-pocket matrixes, each matrix having two one-CD storage pockets that are vertically aligned and located at a distance spaced from said vertical binder edge of said binder page,
a first pattern of three vertically aligned and circular binder holes formed at a location that is spaced a lesser distance from said vertical binder edge of said binder page,
a second pattern of three vertically aligned and elongated binder holes that individually extend in a horizontal direction, and that are individually horizontally aligned with one of said three circular binder holes, said three elongated binder holes being spaced at an intermediate distance from said binder edge of said binder page,
a linear, vertical and deep heat seal fold line extending generally parallel to said binder edge of said binder page, and located to intersect said three elongated binder holes,
each of said first and third sheets having identical first and second linear, vertically aligned and vertically extending through-cuts that define CD insertion/removal openings for said two one-CD storage pockets that are vertically aligned and located at said distance spaced from said vertical binder edge of said binder page, and
each of said first and third sheets having four identical through-cut patterns formed therein to define four finger holes and four horizontally extending slots that individually extend from a left hand side an individual one of said four finger holes, the left hand end of two of said horizontally extending slots terminating at said left hand vertical edge of said binder page, and two of said horizontally extending slots terminating at an individual one of said two vertically extending through-cuts.

10. The three-ring binder page of claim 9 wherein said second sheet comprises;

an intermediate flexible and adhesive layer, and two outer flexible and plastic layers that are formed of a soft plastic material.

11. The three-ring binder page of claim 9 wherein;

said first and third sheets are transparent polypropylene sheets, and said second sheet is an opaque three-ply sheet having an intermediate adhesive layer, and two outer layers of soft polypropylene.

12. The three-ring binder page of claim 11 wherein said two outer layers comprise nonwoven polypropylene of a weight about 30 grams per square yard.

13. A flexible three-ring binder page for removably storing a plurality of CDs in a standard size three-ring binder that has two manually movable and rectangular covers, and three spaced, vertically aligned, two-part binder rings that are manually openable to receive a vertical binder edge of said binder page, said binder page comprising;

a first plastic sheet, a second plastic sheet, and a third plastic sheet, said three sheets being arranged in that order, said first, second and third sheets each having a generally similar rectangular shape whose vertical height generally conforms to the vertical height of a standard size three-ring binder, and whose horizontal width is larger than the horizontal width of a standard size three-ring binder when the two covers thereof are closed, said first sheet, second and third sheets each having a horizontal top edge and a horizontal bottom edge that define said horizontal width, and having a vertical right hand side edge and a vertical left hand side edge that define said vertical height, first heat seal means binding said first sheet, second and third sheets together at said top edge, bottom edge, and right hand side edge to thereby form a unitary three ring binder page wherein said right hand side edge defines a vertical binder edge of said binder page, second heat seal means binding said first, second and third sheets together in a manner to define a plurality of single-CD storage pockets on each side of said binder page, a first pattern of three vertically aligned and circular binder holes formed at a location that is spaced a first distance from said vertical binder edge of said binder page, said first distance placing said circular binder holes over a first part of an open two-part binder ring, a second pattern of three vertically aligned and elongated binder holes individually extending in a horizontal direction and individually horizontally aligned with one of said three circular binder holes, said three elongated binder holes being formed at a location that is spaced a second greater distance from said vertical binder edge of said binder page, said second greater distance placing said elongated binder holes over a second part an open two-part binder ring, a linear and vertical heat seal fold line extending generally parallel to said vertical binder edge of said binder page, and located to intersect said three elongated binder holes, said heat seal fold line being placed at a location that is intermediate the first and second parts of an open two-part binder ring, whereby upon folding of said binder page on said fold line, followed by closing of the two-part binder ring, said left hand vertical side edge of said binder page moves to the right, and said binder page generally conforms to the size of a standard three-ring binder when the two cover thereof are closed.

14. The three-ring binder page of claim 13 wherein said second sheet comprises;

an intermediate flexible and adhesive layer, and two outer flexible and plastic layers, said two outer plastic layers being formed of a soft plastic material.

15. The three-ring binder page of claim 13 wherein;

said first and third sheets are transparent polypropylene sheets, and said second sheet is an opaque three-ply sheet having an intermediate adhesive layer, and two outer layers of soft polypropylene.

16. The three-ring binder page of claim 15 wherein said two outer polypropylene layers are nonwoven.

17. A planar three-ring binder page for removably storing no more than four flat CDs on each side of said binder page, said CDs having equal planar areas and equal diameters, said binder page comprising;

a first planar and flexible plastic sheet, a second planar and flexible plastic sheet, and a third planar and flexible plastic sheet, said three sheets being arranged in that order, said first, second and third sheets each having a generally similar rectangular shape, said first sheet, second and third sheets each having a horizontal top edge and a horizontal bottom edge, and a vertical right hand side edge and a vertical left hand side edge, first heat sealing means binding said first sheet, second and third sheets together at said top edge, bottom edge, and right hand side edge, second heat sealing means binding said first, second and third sheets together in a manner to define four planar single-CD storage pockets on each side of said binder page, each of said storage pockets having a planar area generally equal to the CD planar area, said four storage pockets on each side of said binder page being arranged in a vertical inner pocket column and a vertical outer pocket column that each contain two vertically aligned pockets, said outer column having vertically aligned left hand and right hand pocket boundaries for said two storage pockets in said outer column, said left and right hand pocket boundaries being horizontally spaced a distance about equal a CD diameter, two elongated, vertically extending, and aligned disc insertion/removal slots coincident with said left hand pocket boundary of said outer column and with said left hand side edge of said binder page, said inner column having vertically aligned left and right hand pocket boundaries for said two storage pockets in said inner column, said left and right hand pocket boundaries being horizontally spaced a distance about equal to a CD diameter, two elongate, vertically extending, and aligned disc insertion/removal slots coincident with said left hand pocket boundary of said inner column, a first pattern of three vertically aligned and circular binder holes formed at a location that is spaced from said right hand side edge of said binder page, a second pattern of three vertically aligned and horizontally elongated binder holes that are individually horizontally aligned with one of said three circular binder holes, said three elongated binder holes being formed at a location that is spaced to the left of said three vertically aligned and circular binder holes, a linear and vertical heat seal fold line extending generally parallel to said right hand side edge of said binder page so as to intersect said three elongated binder holes, said fold line being located generally coincident with said right hand pocket boundary of said inner column, a first elongated and short dimension cut formed in said right hand pocket boundary of an upper storage pocket of said inner column at a location generally vertically midway of said right hand pocket boundary, and a second elongated and short dimension cut formed in said right hand pocket boundary of a lower storage pocket of said inner column at a location generally vertically midway of said right hand pocket boundary.

18. The three-ring binder page of claim 17 wherein; said first and third sheets are transparent polypropylene sheets, and said second sheet is an opaque three-ply sheet having an intermediate adhesive layer, and two outer layers of soft polypropylene.

19. The three-ring binder page of claim 18 wherein said two outer polypropylene layers are nonwoven.

20. A planar three-ring binder page providing four CD storage pockets on each side of said binder page for CDs having equal planar areas and equal diameters, said binder page comprising;

a first planar and flexible plastic sheet, a second planar and flexible plastic sheet, and a third planar and flexible plastic sheet, said three sheets being arranged in that order, said first, second and third sheets each having a generally similar rectangular shape, said first sheet, second and third sheets each having a horizontal top edge and a horizontal bottom edge, and a vertical right hand side edge and a vertical left hand side edge, first heat sealing means binding said first sheet, second and third sheets together at said top edge, bottom edge, and right hand side edge, second heat sealing means binding said first, second and third sheets together in a manner to define four planar CD storage pockets on each side of said binder page, each of said storage pockets having a planar area generally equal to the CD planar area, said four storage pockets on each side of said binder page being arranged in a vertical inner pocket column and a vertical outer pocket column that each contain two vertically aligned pockets, said outer column having vertically aligned left hand and right hand pocket boundaries for said two storage pockets in said outer column, said left and right hand pocket boundaries being horizontally spaced a distance about equal a CD diameter, two elongated, vertically extending, and aligned disc insertion/removal slots coincident with said left hand pocket boundary of said outer column and with said left hand side edge of said binder page, said inner column having vertically aligned left and right hand pocket boundaries for said two storage pockets in said inner column, said left and right hand pocket boundaries being horizontally spaced a distance about equal to a CD diameter, two elongate, vertically extending, and aligned disc insertion/removal slots coincident with said left hand pocket boundary of said inner column, a first pattern of three vertically aligned and circular binder holes formed at a location that is spaced from said right hand side edge of said binder page, a second pattern of three vertically aligned and horizontally elongated binder holes that are individually horizontally aligned with one of said three circular binder holes, said three elongated binder holes being formed at a location that is spaced to the left of said three vertically aligned and circular binder holes, and a linear and vertical heat seal fold line extending generally parallel to said right hand side edge of said binder page so as to intersect said three elongated binder holes, said fold line being located generally coincident with said right hand pocket boundary of said inner column, said first and third flexible plastic sheets each being formed of two sheet members corresponding to said vertical inner pocket column and to said vertical outer pocket column, respectively.

21. The three-ring binder page of claim 20 wherein;

a right hand end of each of said two elongated, vertically extending, and aligned disc insertion/removal slots that are coincident with said left hand pocket boundary of said outer column and with said left hand side edge of said binder page terminate at a tapered finger opening that is located centrally of the two storage pockets that are within said vertical outer pocket column, and a right hand end of each of said two elongated, vertically extending, and aligned disc insertion/removal slots that are coincident with said left hand pocket boundary of said inner column terminating at a tapered finger opening that is located centrally of the two storage pockets that are within said vertical outer pocket column.

22. The three-ring binder page of claim 21 wherein each of said tapered finger openings comprise a diverging tear drop shape that terminates at a semicircle shape.

23. The three-ring binder page of claim 22 wherein said second sheet comprises;

an intermediate flexible and adhesive layer, and two outer flexible and soft plastic layers.

24. The three-ring binder page of claim 23 wherein;

said first and third sheets are polypropylene sheets, and said second sheet is an opaque three-ply sheet having an intermediate adhesive layer, and two outer layers of soft polyester.

25. The three-ring binder page of claim 24 wherein said two outer layers of soft polyester comprise nonwoven polyester having a weight of about 30 grams per square yard.

26. A three-ring binder page constructed and arranged to provide four substantially square CD storage pockets on each side of said binder page for storing circular CDs that have generally equal planar areas and generally equal diameters, said binder page comprising;

a first planar and flexible plastic sheet, a second planar and flexible plastic sheet, and a third planar and flexible plastic sheet, said three sheets being arranged in that order, said first, second and third sheets each having a generally similar rectangular shape, said first sheet, second and third sheets each having a horizontal top edge and a horizontal bottom edge, and a vertical right hand side edge and a vertical left hand side edge, a first and a second horizontally extending and linear heat seal binding said first sheet, second and third sheets together at said top edge and bottom edge, respectively, a third horizontally extending and linear heat seal binding said first sheet, second and third sheets together at a horizontal mid portion of said binder page, a three-piece vertically extending and linear heat seal binding said first sheet, second and third sheets together at a vertical mid portion of said binder page, a six-piece vertically extending and linear heat seal binding said first, second and third sheets together at a position that is spaced from said right hand side edge so as to define a vertical page fold line at the location of said six-piece heat seal line, said first, second, third, three-piece and six piece heat seals defining four planar and generally square CD storage pockets on each side of said binder page, each of said storage pockets having a square planar area whose vertical and horizontal dimensions are generally equal, and whose vertical and horizontal dimensions are generally equal to the diameter of a CD, said four storage pockets on each side of said binder page being arranged in a vertical inner pocket column and a vertical outer pocket column, each column contain two vertically aligned storage pockets, said outer column of storage pockets having a vertically aligned right hand storage pocket boundary that is defined by said three-piece heat seal, wherein two gaps in said three-piece seal are centrally provided in said right hand boundary of each of said two storage pockets of said outer column, said inner column of storage pockets having a vertically aligned right hand storage pocket boundary that is defined by said six-piece heat seal wherein two gaps in said six-piece heat seal are centrally provided in said right hand boundary of each of said two said storage pockets of said inner column, two elongated, vertically extending, and aligned disc insertion/removal slots coincident with said left hand pocket boundary of said outer column and with said left hand side edge of said binder page, two elongated, vertically extending, and aligned disc insertion/removal slots coincident with said left hand pocket boundary of said inner column and generally coincident with said three-piece heat seal, a first pattern of three vertically aligned and circular binder holes formed at a location that is spaced from said right hand side edge of said binder page, a second pattern of three vertically aligned and horizontally elongated binder holes that are individually horizontally aligned with one of said three circular binder holes, said three elongated binder holes being formed at a location that is spaced to the left of said three vertically aligned and circular binder holes, and said three elongated binder holes occupying three gaps that are defined by said six-piece heat seal, and a deep linear and vertical heat seal fold line extending generally parallel to said right hand side edge of said binder page so as to intersect said three elongated binder holes, said fold line being located coincident with said right hand pocket boundary of said inner column and coincident with said six-piece heat seal.

27. The three-ring binder page of claim 26 wherein two gaps in said six-piece seal are centrally provided in said right hand boundary of each of said two storage pockets of said inner column.

28. The three-ring binder page of claim 27 including;

four finger openings located in each of said first and third flexible plastic sheets, said four finger openings being individual located centrally of said four storage pockets on each side of said binder page, and four horizontally extending CD insertion/removal slots located in each of said first and third plastic sheets, said four CD insertion removal slots individual extending from one of said finger openings to a left hand boundary of the four storage pockets one each side of said binder page.

29. The three-ring binder page of claim 28 wherein each of said finger openings comprise a semicircular portion and a converging tear drop shape that extends to one end of a said CD insertion/removal slot.

30. The three-ring binder page of claim 29 wherein said second sheet comprises;

an intermediate flexible and adhesive layer, and two outer flexible and soft plastic layers.

31. The three-ring binder page of claim 30 wherein;

said first and third sheets are polypropylene sheets, and said second sheet is an opaque three-ply sheet having an intermediate adhesive layer, and two outer layers of soft polypropylene.

32. The three ring binder page of claim 31 wherein said two outer layers of soft polypropylene comprise nonwoven polypropylene having a weight of about 30 grams per square yard.

33. A three-ring binder page providing four substantially square CD storage pockets on each side of said binder page for storing circular CDs that have equal planar areas and equal diameters, said binder page being constructed and arranged for use within three-ring binders having a standard and general utility size format, said binder page comprising;

a first planar and flexible plastic sheet, a second planar and flexible plastic sheet, and a third planar and flexible plastic sheet, said three sheets being arranged in that order, said first, second and third sheets each having a generally similar rectangular shape, said first, second and third sheets each having a horizontal top edge and a horizontal bottom edge, a vertical left hand side edge, and a vertical right hand binder edge, a first horizontally extending and linear heat seal binding said first sheet, second and third sheets together at said top edge, a second horizontally extending and linear heat seal binding said first, second and third sheets together at a location closely adjacent to said first linear heat seal, a third horizontally extending and linear heat seal binding said first sheet, second and third sheets together at said bottom edge, a fourth horizontally extending and linear heat seal binding said first, second and third sheets together at a location closely adjacent to said first third heat seal, a two-piece horizontally extending and linear heat seal binding said first sheet, second and third sheets together at a horizontal mid portion of said binder page, said two-piece heat seal having a first gap therein, a fifth vertically extending and linear heat seal binding said first sheet, second and third sheets together at a vertical mid portion of said binder page, a four-piece vertically extending and linear heat seal binding said first sheet, second and third sheets together at said right hand binder edge, said four-piece heat seal having a second, third and fourth gap therein, said horizontally extending second, fourth and two-piece heat seals, and said vertically extending fifth and four-piece heat seals cooperating to define four planar and generally square CD storage pockets on each side of said binder page, each of said storage pockets having a square planar area whose vertical and horizontal dimensions are generally equal to the diameter of a CD, said four storage pockets on each side of said binder page being arranged in a vertical inner pocket column and a vertical outer pocket column, each vertical column contain upper and a lower vertically aligned storage pockets, said outer column of storage pockets having a vertically aligned right hand storage pocket boundary that is defined by said fifth heat seal, said inner column of storage pockets having a vertically aligned right hand storage pocket boundary that is defined by said four-piece heat seal, two elongated, vertically extending and aligned disc insertion/removal slots coincident with a left hand pocket boundary of said outer column and with said left hand side edge of said binder page, two elongated, vertically extending and aligned disc insertion/removal slots coincident with a left hand pocket boundary of said inner column and generally coincident with said fifth heat seal, a pattern of three vertically aligned binder holes formed on a vertical axis that is spaced from said right hand side edge of said binder page, an upper one of said three holes being formed within said upper storage pocket of said inner column of pockets and at a location that excludes said planar area of a CD, a lower one of said three holes being formed within said bottom storage pocket of said inner column of pockets and at a location that excludes said planar area of a CD, a middle one of said three holes being formed coincident with said first gap, and a pattern of three vertically aligned, horizontally elongated, and generally U-shaped notches individually formed in said second, third and fourth gap, said slots being individually horizontally aligned with one of said three holes.

34. The three-ring binder page of claim 33 including;

four finger openings located in each of said first and third flexible plastic sheets, said four finger openings being individual located centrally of said four storage pockets on each side of said binder page, and four horizontally extending CD insertion/removal slots located in each of said first and third plastic sheets, said four CD insertion removal slots individual extending from one of said finger openings to a left hand boundary of said four storage pockets on each side of said binder page.

35. The three-ring binder page of claim 34 wherein each of said finger openings comprise a semicircular portion and a converging tear drop shape that extends to one end of a said CD insertion/removal slot.

36. The three-ring binder page of claim 33 wherein said second sheet comprises;

an intermediate flexible and adhesive layer, and two outer flexible and soft plastic layers.

37. The three ring binder page of claim 36 wherein;

said first and third sheets are polypropylene sheets, and said second sheet is an opaque three-ply sheet having an intermediate adhesive layer, and two outer layers of soft polypropylene.

38. The three-ring binder page of claim 37 wherein said two outer layers of soft polypropylene comprise nonwoven polypropylene having a weight of about 30 grams per square yard.

39. The three-ring binder page of claim 38 including;

four finger openings located in each of said first and third flexible plastic sheets, said four finger openings being individual located centrally of said four storage pockets on each side of said binder page, and four horizontally extending CD insertion/removal slots located in each of said first and third plastic sheets, said four CD insertion removal slots individually extending from one of said finger openings to a left hand boundary of said four storage pockets on each side of said binder page.

40. The three-ring binder page of claim 39 wherein each of said finger openings comprise a semicircular portion and a converging tear drop shape that extends to one end of a said CD insertion/removal slot.

41. The three-ring binder page of claim 39 including;

four finger openings located in each of said first and third flexible plastic sheets, said four finger openings being individual located centrally of said four storage pockets on each side of said binder page, and four horizontally extending CD insertion/removal slots located in each of said first and third plastic sheets, said four CD insertion removal slots individually extending from a central location of a storage pocket to a left hand boundary of a four storage pocket on each side of said binder page.

42. The three-ring binder page of claim 41 wherein each of said CD insertion removal slots is of a vertical height not exceeding 0.50-inch.

* * * * *